(12) United States Patent
Hammond et al.

(10) Patent No.: US 8,169,107 B2
(45) Date of Patent: May 1, 2012

(54) METHOD AND SYSTEM FOR REDUCING SWITCHING LOSSES IN A HIGH-FREQUENCY MULTI-CELL POWER SUPPLY

(75) Inventors: Peter Willard Hammond, Greensburg, PA (US); Mukul Rastogi, Murrysville, PA (US)

(73) Assignee: Siemens Industry, Inc., Alpharetta, GA (US)

( * ) Notice: Subject to any disclaimer, the term of this patent is extended or adjusted under 35 U.S.C. 154(b) by 469 days.

(21) Appl. No.: 12/474,746

(22) Filed: May 29, 2009

(65) Prior Publication Data

US 2009/0302682 A1 Dec. 10, 2009

Related U.S. Application Data

(60) Provisional application No. 61/057,341, filed on May 30, 2008, provisional application No. 61/057,397, filed on May 30, 2008.

(51) Int. Cl.
*H02J 7/34* (2006.01)

(52) U.S. Cl. ............... 307/52; 363/39; 363/41; 363/43; 363/65; 363/68; 363/71

(58) Field of Classification Search ................ None
See application file for complete search history.

(56) References Cited

U.S. PATENT DOCUMENTS

| | | | |
|---|---|---|---|
| 5,168,437 A | 12/1992 | Gyugyi et al. | |
| 5,400,237 A | 3/1995 | Flanagan et al. | |
| 5,625,545 A * | 4/1997 | Hammond | 363/71 |
| 5,638,263 A * | 6/1997 | Opal et al. | 363/65 |
| 5,642,275 A | 6/1997 | Peng et al. | |
| 6,014,323 A * | 1/2000 | Aiello et al. | 363/71 |
| 6,075,350 A | 6/2000 | Peng | |
| 6,101,109 A * | 8/2000 | Duba et al. | 363/71 |
| 6,151,227 A * | 11/2000 | Mizutani et al. | 363/41 |
| 6,205,042 B1 * | 3/2001 | Bixel | 363/95 |
| RE37,126 E | 4/2001 | Peng et al. | |
| 6,229,722 B1 * | 5/2001 | Ichikawa et al. | 363/71 |
| 6,411,530 B2 * | 6/2002 | Hammond et al. | 363/41 |
| 6,954,366 B2 * | 10/2005 | Lai et al. | 363/71 |
| 7,428,158 B2 * | 9/2008 | Bousfield et al. | 363/65 |
| 7,511,975 B2 * | 3/2009 | Hammond | 363/49 |
| 7,830,681 B2 * | 11/2010 | Abolhassani et al. | 363/37 |
| 7,940,537 B2 * | 5/2011 | Abolhassani et al. | 363/65 |
| 2001/0038541 A1* | 11/2001 | Hammond et al. | 363/40 |
| 2003/0231517 A1* | 12/2003 | Bixel | 363/71 |

(Continued)

OTHER PUBLICATIONS

Chiasson et al., "Eliminating Harmonics in a Multilevel Converter Using Resultant Theory", IEEE, 2002, pp. 503-508, 0-7803-7262-X.
Tolbert, et al. Published in IEEE Transactions on Industrial Electronics, vol. 49, No. 5, Oct. 2002 (pp. 1058-1064); Magazine.
Li, et al. Published in IEEE Transactions on Industry Applications, vol. 36, No. 1, Jan./Feb. 2000 (pp. 160-170); Magazine.

(Continued)

*Primary Examiner* — Rexford N Barnie
*Assistant Examiner* — Justen Fauth

(57) ABSTRACT

A method of reducing switching losses in a power supply includes the steps of advancing the output voltage of a first pole of a power cell by a first angle, retarding the output voltage of a second pole of the power cell by a second angle, and producing a combined output voltage of the power cell equal to a positive pulse of a duration angle equal to the sum of the first angle and the second angle for a first half of a switching cycle of the power cell, and equal to a negative pulse of a duration angle equal to the sum of the first angle and the second angle for a second half of the switching cycle of the power cell.

19 Claims, 29 Drawing Sheets

U.S. PATENT DOCUMENTS

| | | | |
|---|---|---|---|
| 2005/0219879 A1* | 10/2005 | Bixel | 363/71 |
| 2006/0028848 A1* | 2/2006 | Lai et al. | 363/39 |
| 2008/0079314 A1* | 4/2008 | Hammond | 307/43 |
| 2010/0072824 A1* | 3/2010 | Abolhassani et al. | 307/82 |
| 2010/0142234 A1* | 6/2010 | Abolhassani et al. | 363/41 |

OTHER PUBLICATIONS

Guan, et al. Publised in Proceedings 1st IEEE Conference on Industrial Electronics and Applications, Singapore, May 24, 2006 (pp. 1-6); Magazine.

* cited by examiner

METHOD AND SYSTEM FOR REDUCING SWITCHING LOSSES IN A HIGH-FREQUENCY MULTI-CELL POWER SUPPLY

CROSS REFERENCE TO RELATED PATENTS

This application claims the priority benefit of U.S. Provisional Application No. 61/057,341 and U.S. Provisional Application No. 61/057,397, each of which was filed on May 30, 2008.

BACKGROUND

This application discloses an invention that is related, generally and in various embodiments, to a system and method for reducing switching losses in a high frequency multi-cell power supply.

In certain applications, multi-cell power supplies utilize modular power cells to process power between a source and a load. For example, FIG. 1 illustrates various embodiments of a power supply (e.g., an AC motor drive) having nine such power cells. The power cells in FIG. 1 are represented by a block having input terminals A, B, and C, and output terminals T1 and T2. In FIG. 1, a transformer or other multi-winding device 110 receives three-phase, medium-voltage power at its primary winding 112, and delivers power to a load 130 such as a three-phase AC motor via an array of single-phase inverters (also referred to as power cells). Each phase of the power supply output is fed by a group of series-connected power cells, called herein a "phase-group".

The transformer 110 includes primary windings 112 that excite a number of secondary windings 114-122. Although primary windings 112 are illustrated as having a star configuration, a mesh configuration is also possible. Further, although secondary windings 114-122 are illustrated as having a delta or an extended-delta configuration, other configurations of windings may be used as described in U.S. Pat. No. 5,625,545 to Hammond, the disclosure of which is incorporated herein by reference in its entirety.

Any number of ranks of power cells are connected between the transformer 110 and the load 130. A "rank" in the context of FIG. 1 is considered to be a three-phase set, or a group of three power cells established across each of the three phases of the power delivery system. Referring to FIG. 1, rank 150 includes power cells 151-153, rank 160 includes power cells 161-163, and rank 170 includes power cells 171-173. A master control system 195 sends command signals to local controls in each cell over fiber optics or another wired or wireless communications medium 190. It should be noted that the number of cells per phase depicted in FIG. 1 is exemplary, and more than or less than three ranks may be possible in various embodiments.

In the example of FIG. 1 there is a separate secondary winding for each power cell. However, the number of power cells and/or secondary windings illustrated in FIG. 1 is merely exemplary, and other numbers are possible. The secondary windings in each rank may have the same phase angle, which may differ from the phase angle of all the other ranks. For applications in which all the cells carry an equal share of the load power, this arrangement causes many of the harmonics in the cell input currents to cancel in the transformer 110, so that they are not passed through to the primary currents.

FIG. 2 illustrates various embodiments of a power cell 210 which is representative of various embodiments of the power cells of FIG. 1. The power cell 210 includes a three-phase diode-bridge rectifier 212, one or more direct current (DC) capacitors 214, and an H-bridge inverter 216. The rectifier 212 converts the alternating current (AC) voltage received at cell input 218 (i.e., at input terminals A, B and C) to a substantially constant DC voltage that is supported by each capacitor 214 that is connected across the output of the rectifier 212. The output stage of the power cell 210 includes an 11-bridge inverter 216 which includes two poles, a left pole and a right pole, each with two switching devices 217, which in this example are insulated gate bipolar transistors (IGBTs). The inverter 216 transforms the DC voltage across the DC capacitors 214 to an AC voltage at the cell output 220 (i.e., across output terminals T1 and T2), often by using pulse-width modulation (PWM) of the semiconductor devices in the H-bridge inverter 216.

As shown in FIG. 2, the power cell 210 may also include fuses 230 connected between the cell input 218 and tile rectifier 212. The fuses 230 may operate to help protect the power cell 210 in the event of a short-circuit failure. According to other embodiments, the power cell 210 may be identical to or similar to those described in U.S. Pat. No. 5,986,909 or U.S. Pat. No. 6,222,284 to Hammond and Aiello, the disclosures of which are incorporated herein by reference in their entirety.

FIG. 3 illustrates exemplary waveforms associated with various embodiments of a power supply controlled by PWM. The power supply includes six power cells per phase, but is otherwise similar to the power supply of FIG. 1. The waveforms show a reference signal 302, a carrier signal 304, a voltage 306 which is the sum of voltages from six power cells in phase A, and a load voltage 308 from phase A to neutral.

Referring to FIGS. 2 and 3, the reference signal 302 represents the desired output voltage for one pole of an H-bridge inverter 216 in a power cell. The carrier signal 304 is a symmetrical triangular waveform oscillating at the desired switching frequency. The reference signal 302 may be compared with the carrier signal 304 to control the switching of one pole of the H-bridge inverter 216. When the reference signal 302 is greater than the carrier signal 304, the pole is switched to the positive DC voltage from capacitors 214, otherwise the pole is switched to the negative DC voltage from capacitors 214. For the other pole of the H-bridge inverter 216, the desired voltage is the inverse of the same reference signal. Therefore, the inverse of the reference signal may be compared with the same carrier signal (or vice-versa) to control the other pole. The other cells in the same phase group may use the same reference signal, and time-displaced replicas of the carrier signal. The sum 306 of the output voltages of all the cells in the phase-group is shown in FIG. 3. The other two phase-groups use the same set of carriers, with replicas of the reference waveform that are displaced in phase by ±120°. Therefore, the other two phase-groups produce similar sum voltages, which are also displaced in phase by ±120°. These three sum voltages give rise to three line-to-neutral voltages on the load, one of which 308 is shown in FIG. 3. This PWM method results in all of the cells carrying an equal share of the load power, thus allowing many harmonics in the cell input currents to cancel in the transformer. Additional details of this PWM method may be found, for example, in U.S. Pat. No. 5,625,545.

The example of FIG. 3 shows a carrier signal 304 that is oscillating at a desired switching frequency that is ten times the frequency of the reference signal. In many motor-drive applications the maximum desired output frequency is 60 hertz. Thus, with respect to FIG. 3, if the maximum desired output frequency is 60 hertz, the switching frequency in FIG. 3 is 600 hertz. Modern switching devices, such as IGBTs, can easily switch at 600 hertz without excessive switching losses.

FIG. 4 illustrates a plot of the frequency spectrum of the load voltage in FIG. 3. The vertical axis is scaled so that the fundamental (wanted) component 402 registers zero dB. FIG. 4 shows that the lowest harmonic (unwanted) component 404 which exceeds −40 dB (1% of the fundamental) is the 89$^{th}$ harmonic. If the fundamental (wanted) frequency is at 60 hertz, then the 89$^{th}$ harmonic will be at 5340 hertz. This large separation in frequency between the wanted and unwanted components is characteristic of PWM, when the switching frequency is significantly greater than the wanted frequency. Often, the load 130 includes significant series inductance (for example, an AC motor), and the high frequencies of the unwanted voltage components allows this inductance to suppress the resulting unwanted currents.

However, there are many applications where the wanted frequency is much greater than 60 hertz. For example, there is an emerging trend to connect a high-speed motor directly to a high-speed compressor or pump, without an intervening step-up gearbox. For such applications, the motor may be driven by a source of high-frequency power in order to spin at 5,000 RPM or more. For motors with more than two poles, the required frequency is even higher.

When the wanted frequency is increased to several hundred hertz, it becomes more difficult to extend the PWM method of FIG. 3 while still maintaining a switching frequency much higher than the wanted frequency. At a switching frequency of several thousand hertz, the switching losses may become the dominant losses in the power supply, the IGBTs may have to be operated below their nominal current rating, and the cost per kilowatt would increase FIG. 5 illustrates exemplary waveforms associated with various embodiments of a power supply controlled by PWM. FIG. 5 is similar to FIG. 3, but is different in that the carrier signal 504 is oscillating at a switching frequency that is only four times the wanted frequency of the reference signal 502. In comparison to FIG. 3, it is clear that there are fewer steps per cycle in FIG. 5. FIG. 5 also shows the sum 506 of the output voltages of all of the cells in the phase group, along with a line-to-neutral voltage 508.

FIG. 6 illustrates a plot of the frequency spectrum of the load voltage in FIG. 5. The vertical axis is scaled so that the fundamental (wanted) component 602 registers zero dB. FIG. 6 shows that the lowest harmonic (unwanted) component 604 which exceeds −40 dB (1% of the fundamental) is the 17$^{th}$ harmonic. By reducing the ratio of switching-to-reference frequency by a factor of 2.5 (from ten in FIG. 3 to four in FIG. 5), the ratio of unwanted to wanted frequencies has been reduced by a factor of 5.24 (from 89 in FIG. 4 to 17 in FIG. 6). The amplitudes of the unwanted currents of FIG. 6 are increased by a similar factor over the amplitudes of the unwanted currents of FIG. 4.

Even with a switching frequency of only four times a wanted frequency of several hundred hertz, some derating of the IGBTs, and some increase in tile data transmission rate, may still be necessary in the prior art.

SUMMARY OF THE INVENTION

Before the present methods are described, it is to be understood that this invention is not limited to the particular systems, methodologies or protocols described, as these may vary. It is also to be understood that the terminology used herein is for the purpose of describing particular embodiments only, and is not intended to limit the scope of the present disclosure which will be limited only by the appended claims.

It must be noted that as used herein and in the appended claims, the singular forms "a," "an," and "the" include plural reference unless the context clearly dictates otherwise. Unless defined otherwise, all technical and scientific terms used herein have the same meanings as commonly understood by one of ordinary skill in the art. As used herein, the term "comprising" means "including, but not limited to."

In one general respect, the embodiments disclose a method of reducing switching losses in a power supply. The method includes the steps of advancing the output voltage of a first pole of a power cell by a first angle, retarding the Output voltage of a second pole of the power cell by a second angle, and producing a combined output voltage of the power cell equal to a positive pulse of a duration angle equal to the sum of the first angle and the second angle for a first half of a switching cycle of the power cell, and equal to a negative pulse of a duration angle equal to the sum of the first angle and the second angle for a second half of the switching cycle of the power cell.

In another general respect, the embodiments disclose a method of reducing switching losses in a multi-cell power supply. The method includes the steps of applying a first angle command of a selective harmonic eliminiation control pattern to a first power cell of a first phase group of a multi-cell power supply, applying a second angle command of the selective harmonic elimination control pattern to a second power cell of the first phase group of the power supply, wherein at least one of the first angle command and the second angle command is a negative angle command, applying the second angle command to a power cell other than the second power cell after a first portion of a switching cycle of the power supply, and applying the first angle command to the second power cell.

In another general respect, the embodiments disclose a multi-cell power supply. The power supply includes a plurality of power cells arranged into at least a first phase group and a control system in communication with the power cells. The control system is configured to apply a first angle command of a selective harmonic elimination control pattern to a first power cell of the first phase group, apply a second angle command of the selective harmonic elimination control pattern to a second power cell of the first phase group, wherein at least one of the first angle command and the second angle command is a negative angle command, apply the second angle command to a power cell other than the second power cell after a first portion of a switching cycle of the power supply, and apply tile first angle command to the second power cell.

DETAILED DESCRIPTION

It is to be understood that at least some of the figures and descriptions of the invention have been simplified to focus on elements that are relevant for a clear understanding of the invention, while eliminating, for purposes of clarity, other elements that those of ordinary skill in the art will appreciate may also comprise a portion of the invention. However, because such elements are well known in the alt, and because they do not necessarily facilitate a better understanding of the invention, a description of such elements is not provided herein.

Figure 5:
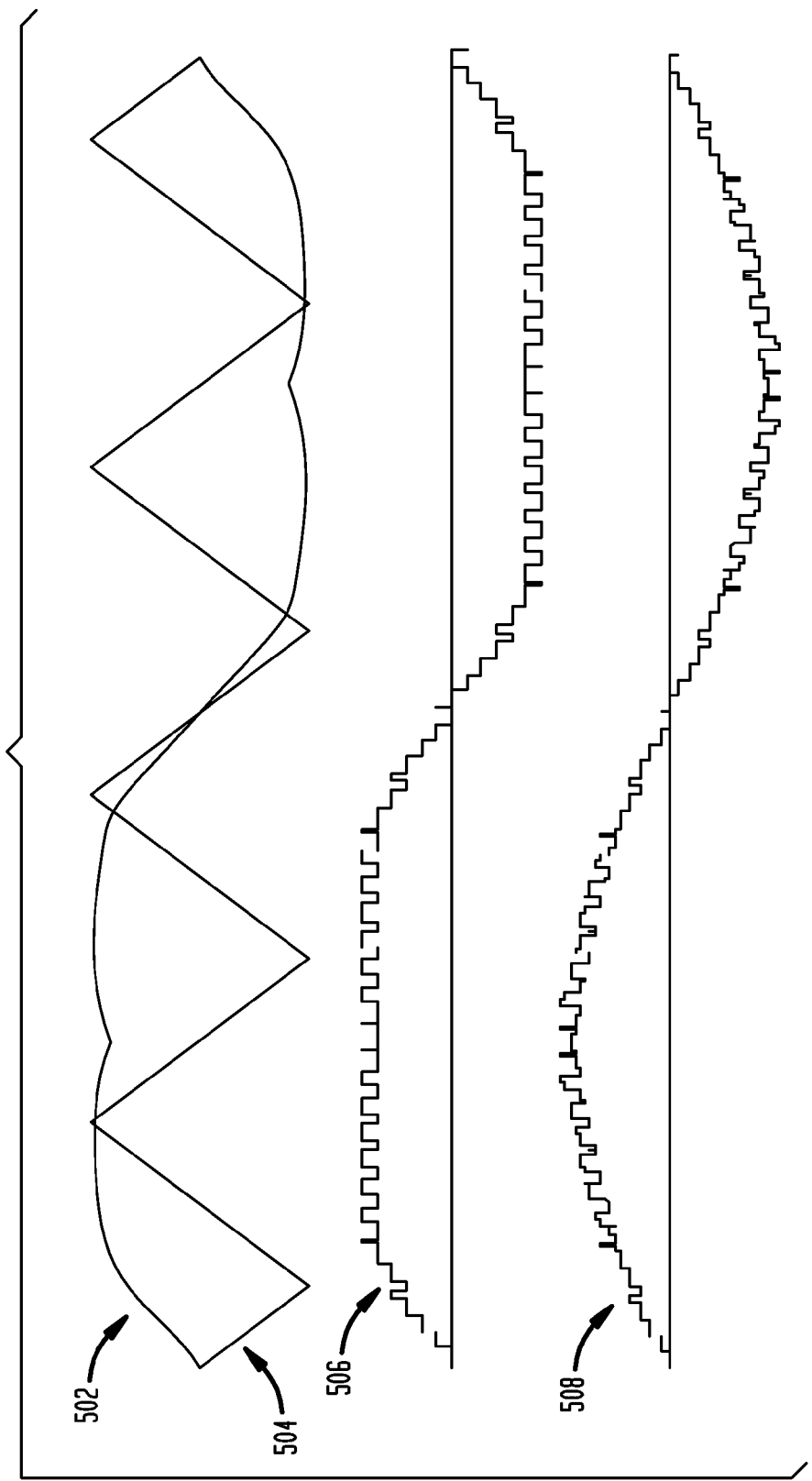
FIG. 5 illustrates exemplary waveforms associated with various embodiments of a prior art power supply controlled by pulse width modulation.
Figure 6:
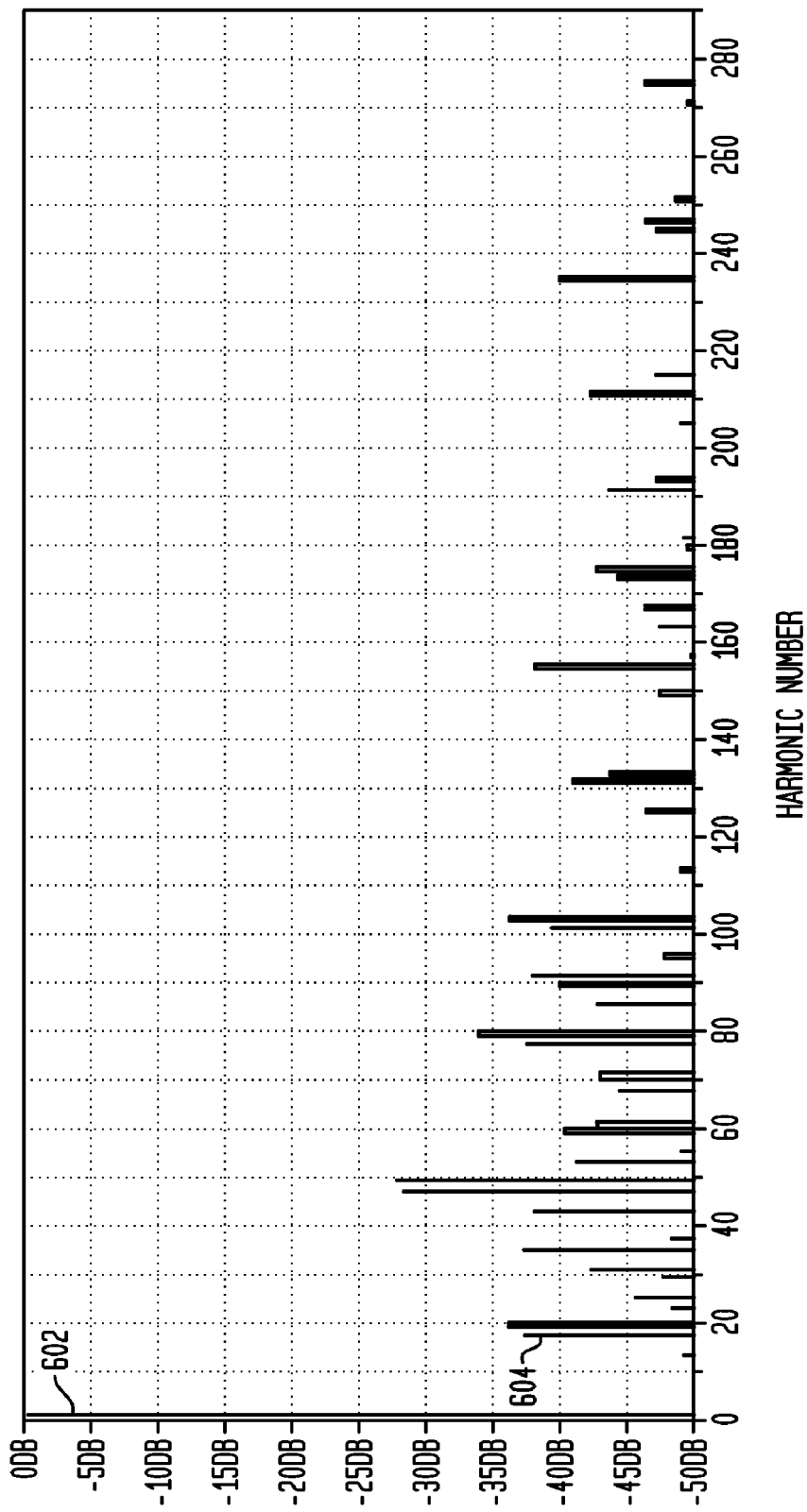
FIG. 6 illustrates a plot of the frequency spectrum of the load voltage in FIG. 5.
Figure 7:
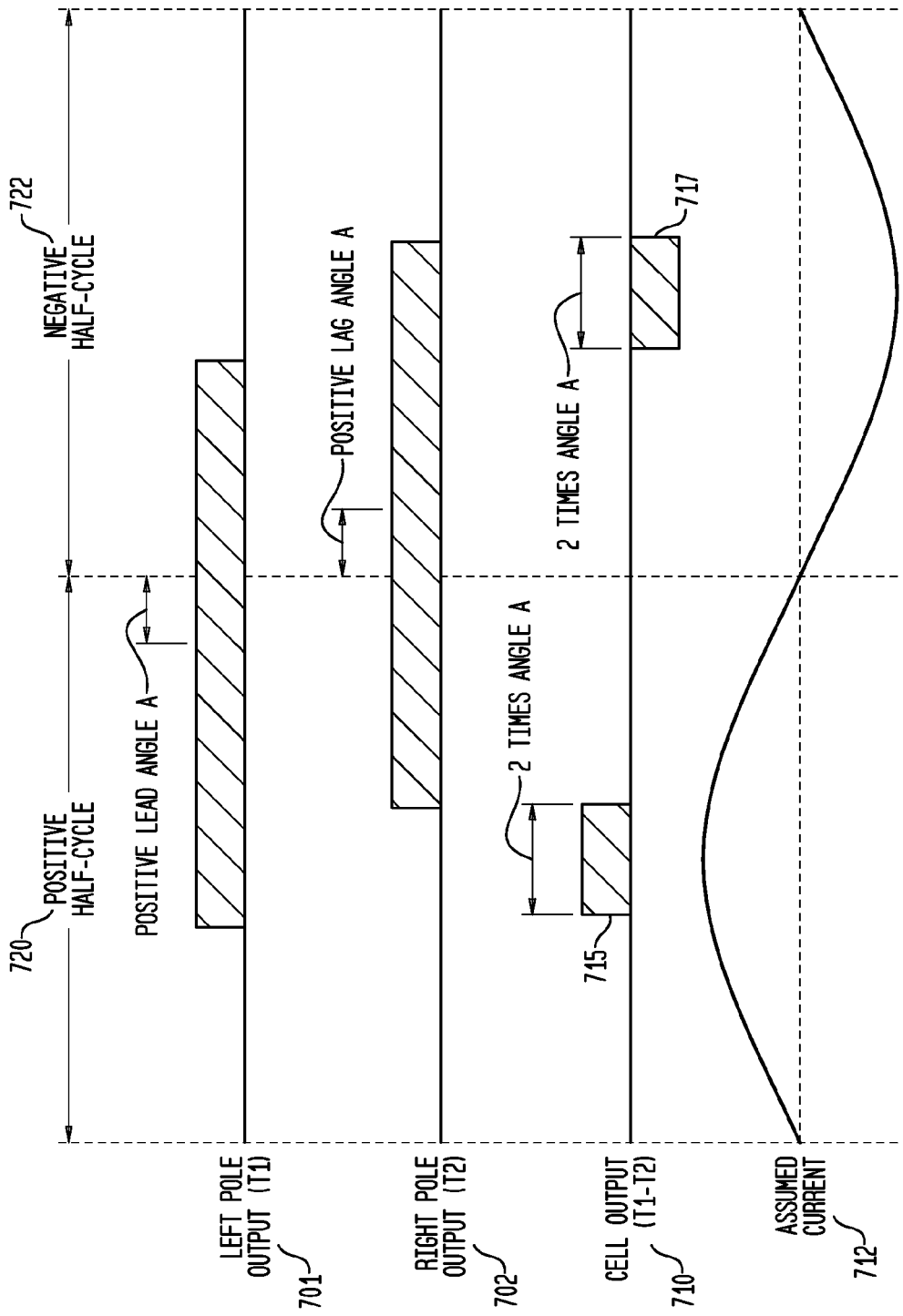
FIG. 7 illustrates a selective harmonic elimination (SHE) control pattern according to various embodiments.

FIG. 7 illustrates a selective harmonic elimination (SHE) control pattern according to various embodiments. When a SHE method is utilized for controlling a power supply which has six cells per phase and is otherwise similar to the power supply of FIG. 1 having cells such as those in FIG. 2, the SHE method may achieve a ratio of unwanted to wanted frequencies of 17, which is as good as the ratio achieved utilizing a PWM method as described with respect to FIGS. 5 and 6. It should be noted that other ratios are possible. However, whereas the described PWM method can achieve this ratio with a switching frequency that is four times the wanted frequency, the SHE method may achieve this result with a switching frequency equal to the wanted frequency. In other words, with this embodiment of the SHE method, each switching device turns ON and OFF only once per cycle. Additionally, the ratio can be achieved with no increase in the rate at which data is transmitted from the master control to the cells. Various embodiments of SHE methods are described in U.S. Pat. No. 6,075,350 (Peng), and in the IEEE paper "Eliminating Harmonics in a Multilevel Converter using Resultant Theory", by Chiasson et al.

Figure 2:
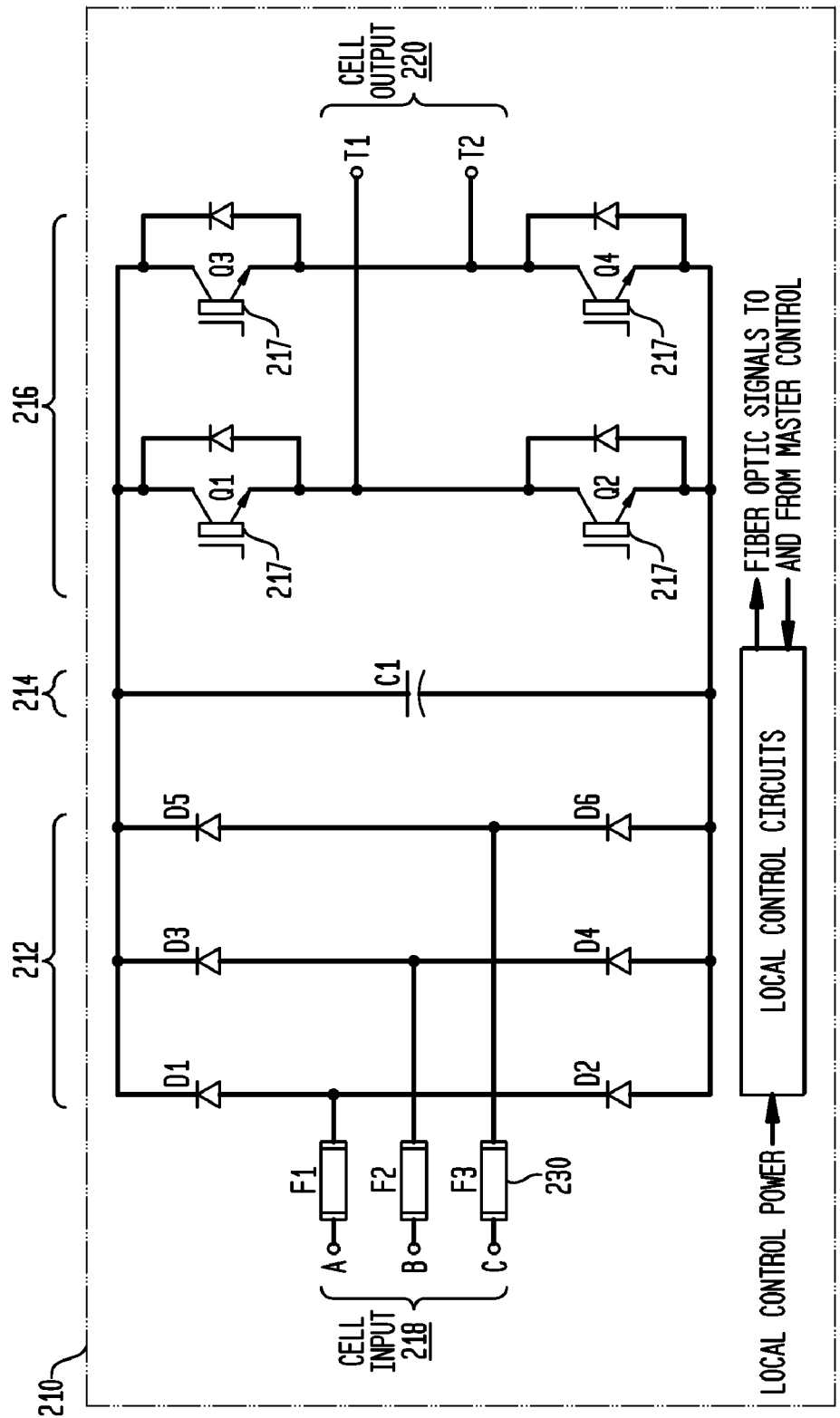
FIG. 2 illustrates various embodiments of a power cell of the prior art power supply of FIG. 1.
Figure 3:
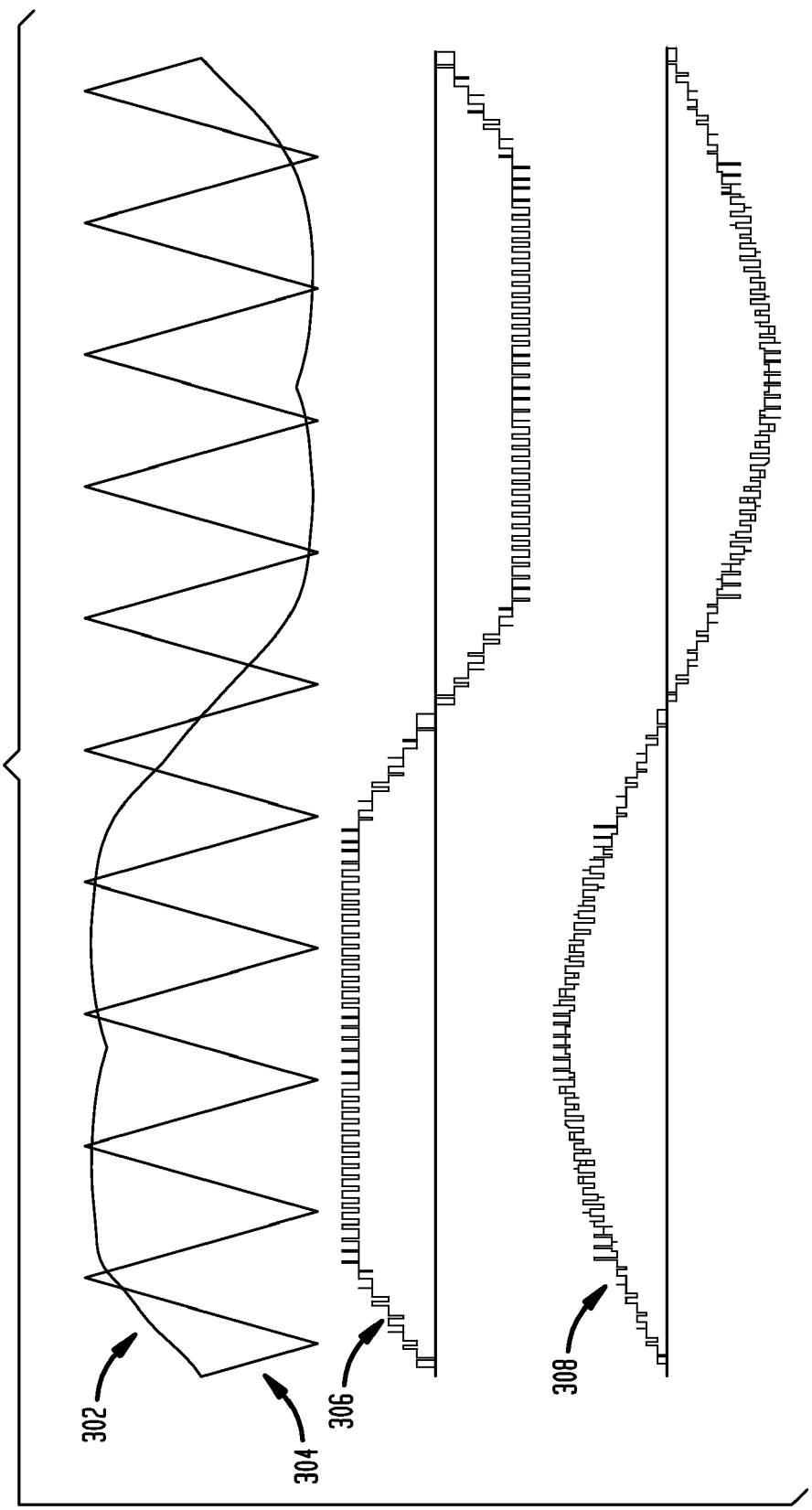
FIG. 3 illustrates exemplary waveforms associated with various embodiments of a prior art power supply controlled by pulse width modulation.
Figure 4:
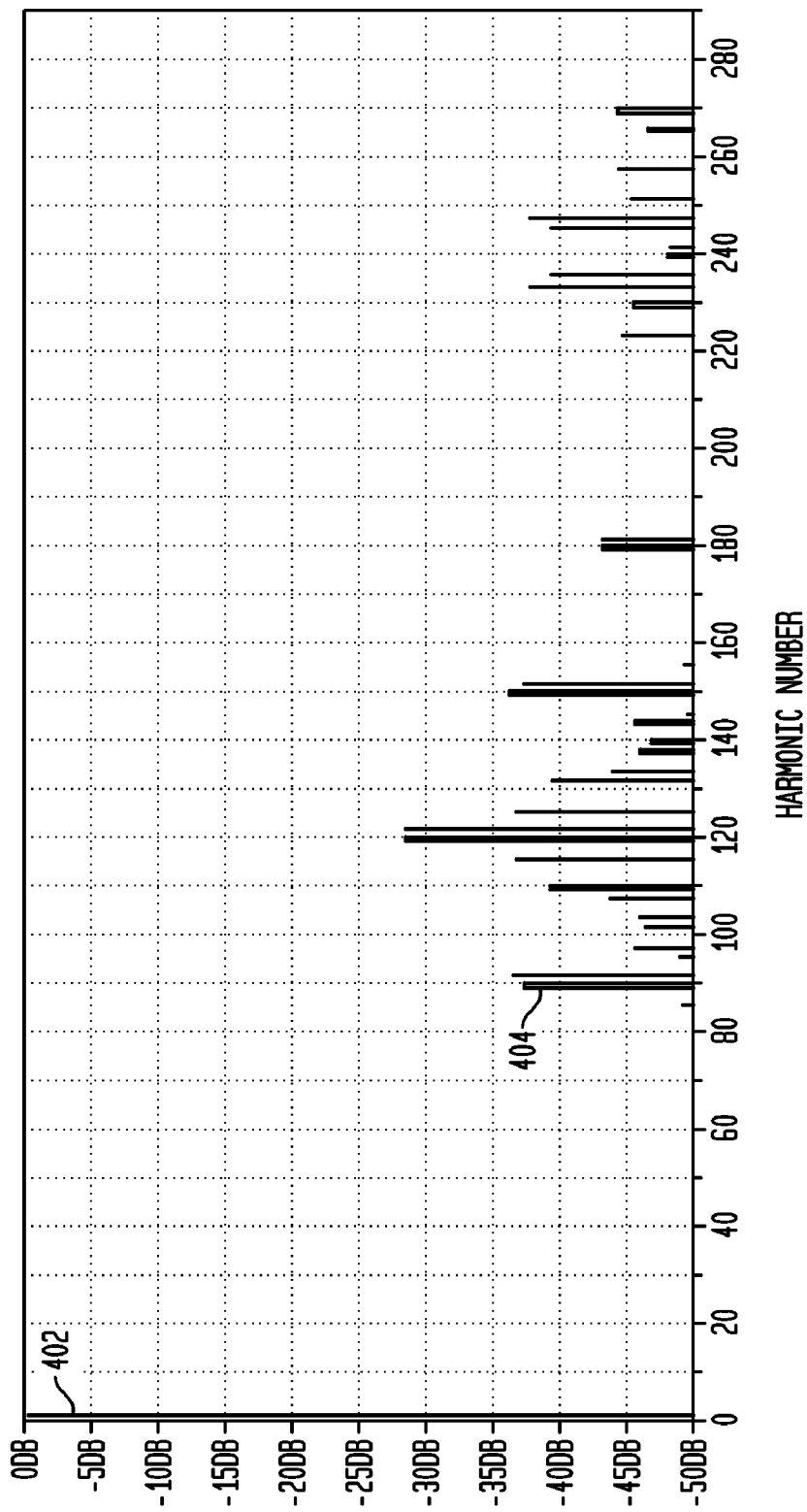
FIG. 4 illustrates a plot of the frequency spectrum of the load voltage in FIG. 3.

The SHE control pattern of FIG. 7 is shown for a power cell such as that shown in FIG. 2, where T1 leads T2 in phase, and the switching frequency is equal to the wanted frequency. Each switching device in the H-bridge inverter (elements 217 within element 216 of FIG. 2) of the power cell is ON for one half-cycle, and OFF for the other half-cycle. Therefore, each pole of the H-bridge inverter produces a symmetrical square-wave of voltage 701, 702 at the wanted frequency. The output voltage 710 from the cell is the difference between the two pole voltages. If the two square-wave voltages on T1 and T2 were exactly in phase, then the output voltage from the cell would always be zero. However, as indicated in FIG. 7, the left pole (T1) output 701 can be advanced by an arbitrary angle A, while the right pole (T2) output 702 can be retarded by the same angle A. The result is that the output voltage from the cell (the difference between T1 and T2) 710 appears in the form of a positive pulse 715 of duration angle 2*A at the center of the positive half-cycle 720 where current 712 is positive, and a negative pulse 717 of duration angle 2*A at the center of the negative half-cycle 722 where current 712 is negative. For the remainder of the cycle the output voltage from the cell is zero. Since the cell produces positive voltage during the positive half-cycle 720 (when the load current is positive), and negative voltage during the negative half-cycle 722 (when the load current is negative), power flows from the cell to the load. With this control pattern there is only one degree of freedom for the control of the cell, namely the value of the angle A.

In general, when this SHE method is utilized with "X" number of power cells connected in series, the phase-group of "X" cells in series has "X" degrees of freedom for control. For example, when this SHE method is utilized with six power cells connected in series, it is possible for each of the six power cells to have a different value for the angle A. Therefore, a phase-group of six cells in series has six degrees of freedom for control. One degree of freedom is utilized to establish the desired fundamental amplitude. The remaining five degrees of freedom may be utilized to eliminate up to five separate unwanted harmonics.

Figure 8:
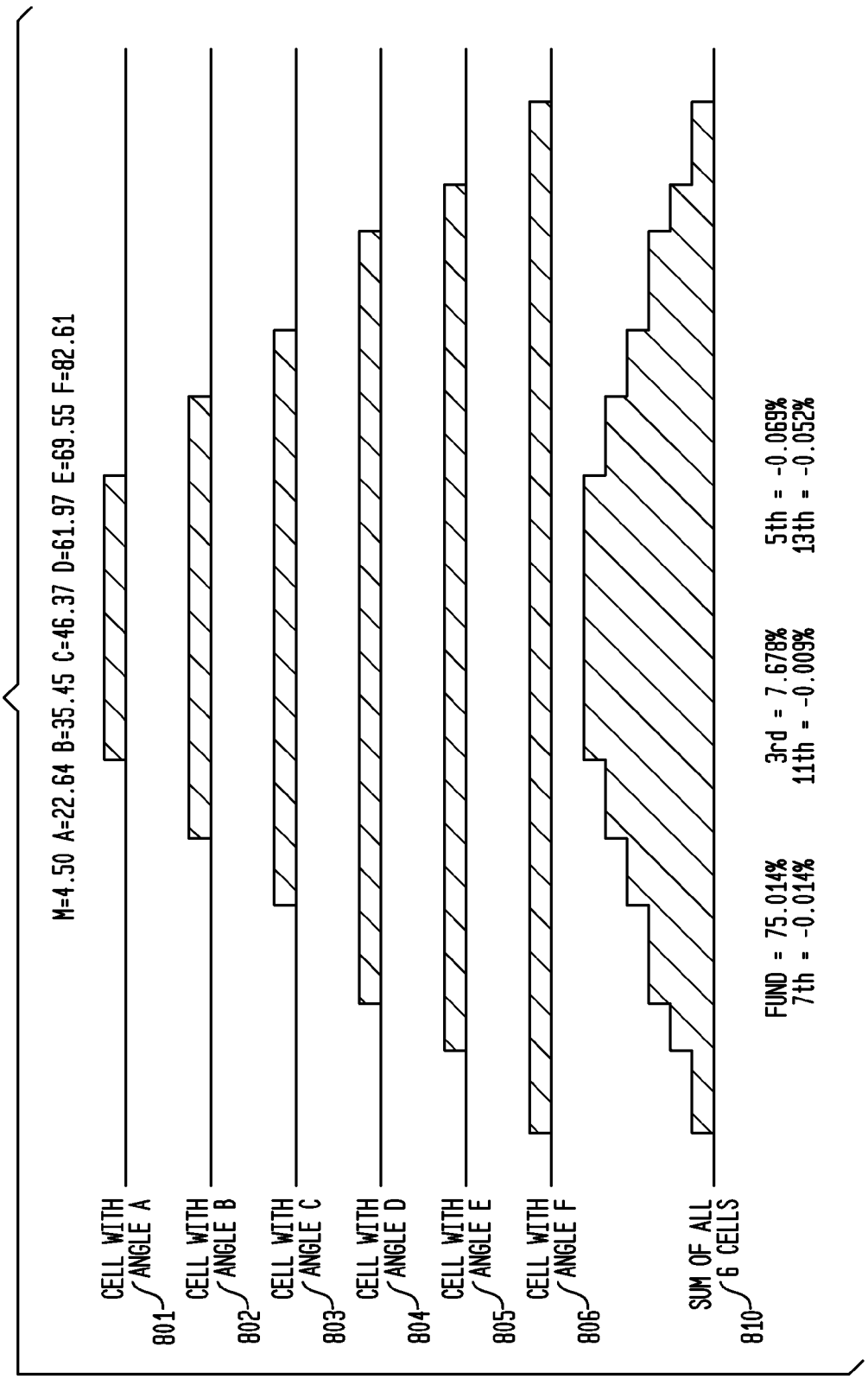
FIG. 8 illustrates the output voltages of six cells in a phase-group of a power supply according to various embodiments.

FIG. 8 illustrates the Output voltages 801-806 of six cells in a phase-group of a power supply according to various embodiments. For purposes of simplicity, only the positive one half-cycle of the cell output voltages are shown in FIG. 8, since the negative half-cycle will be the same except with opposite polarity. For such embodiments, each cell utilizes the above-described SHE control method with a different angle. The six different angles (A, B, C, D, E, and F) are shown next to the corresponding cell output voltages in FIG. 8, and the values in degrees of the respective angles are listed at the top of FIG. 8. These angles represent one half of the pulse width from each cell. The value of "M" is proportional to the desired fundamental output voltage of the phase-group. As shown in FIG. 8, each pulse of cell output voltage is centered in the half-cycle at 90°. FIG. 8 also illustrates various embodiments of the waveform 810 that results from summing together tile six series-connected cells, together with the amplitudes of the fundamental and the first five odd harmonics. For the angles chosen, the fundamental (wanted) voltage has approximately 75% of its maximum value, but the $5^{th}$, $7^{th}$, $11^{th}$, and $13^{th}$ harmonic (unwanted) voltages are all below 0.07%. The $3^{rd}$ harmonic is not zero, but since all harmonics divisible by three are zero-sequence (if they are balanced in all three phases), they cannot appear on the load due to the three-wire connection.

The set of simultaneous equations that relate the values of the angles to the desired fundamental and to the unwanted harmonics are transcendental, which means there is no analytical solution. According to various embodiments, the method described in the above-referenced Chiasson paper may be utilized to find sets of angles that give the desired fundamental while eliminating certain harmonics. According to other embodiments, a converging search may be performed with a computing device to find sets of angles that give the desired fundamental while eliminating certain harmonics. These "off-line" solutions may be stored in a memory device for real-time use in the master control.

Figure 9:
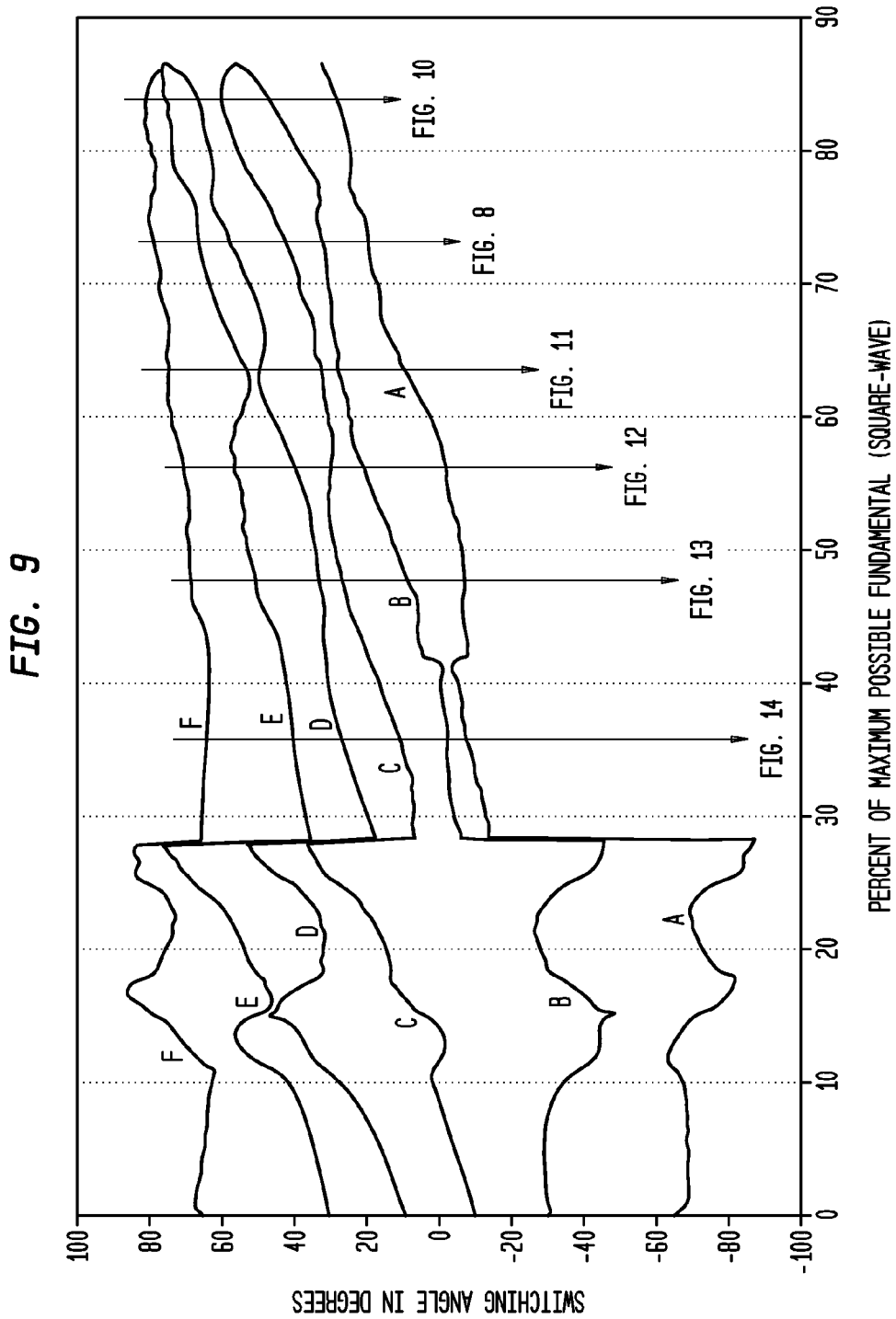
FIG. 9 illustrates results of two converging searches configured to give a desired fundamental while eliminating certain harmonics.

Such solutions, however, do not necessarily exist for all possible values of fundamental (wanted) voltage. The results of two converging searches are illustrated in FIG. 9. Although there were ranges of fundamental voltage where no solution could be found when each search was configured to eliminate five harmonics, a first continuous solution was found between 87% and 25% fundamental and a second continuous solution was found between 28% and 0% fundamental when the search was configured to eliminate only four harmonics (the $5^{th}$, $7^{th}$, $11^{th}$, and $13^{th}$). The angles A-F found by these two searches are combined above and below 28% in FIG. 9.

Waveforms corresponding to the angles A-F in FIG. 9 are shown in FIGS. 8, 10, 11, 12, 13, and 14, for six specific values of fundamental voltage. These six specific values are indicated by dotted vertical arrows in FIG. 9, and respectively correspond to FIGS. 8, 10, 11, 12, 13 and 14.

FIGS. 10-14 are similar to FIG. 8 in that they each list a value for "M", list the values in degrees of the six respective angles A-E, illustrate the output voltages of six cells in a phase-group of a power supply according to various embodiments, the angles each represent one half of the pulse width from each cell, the value of only one half-cycle of the cell output voltages are shown, each pulse of cell output voltage is centered on 90°, and illustrate various embodiments of the waveform that results from summing together the six series-connected cells, together with the amplitudes of the fundamental and the first five odd harmonics.

However, each of FIGS. 8 and 10-14 is associated with a different fundamental voltage. Whereas the desired fundamental associated with FIG. 8 is approximately 75% of maximum, the desired fundamentals respectively associated with FIGS. 10-14 are approximately 85% of maximum, 63% of maximum, 56% of maximum, 48% of maximum and 36% of maximum.

Figure 10:
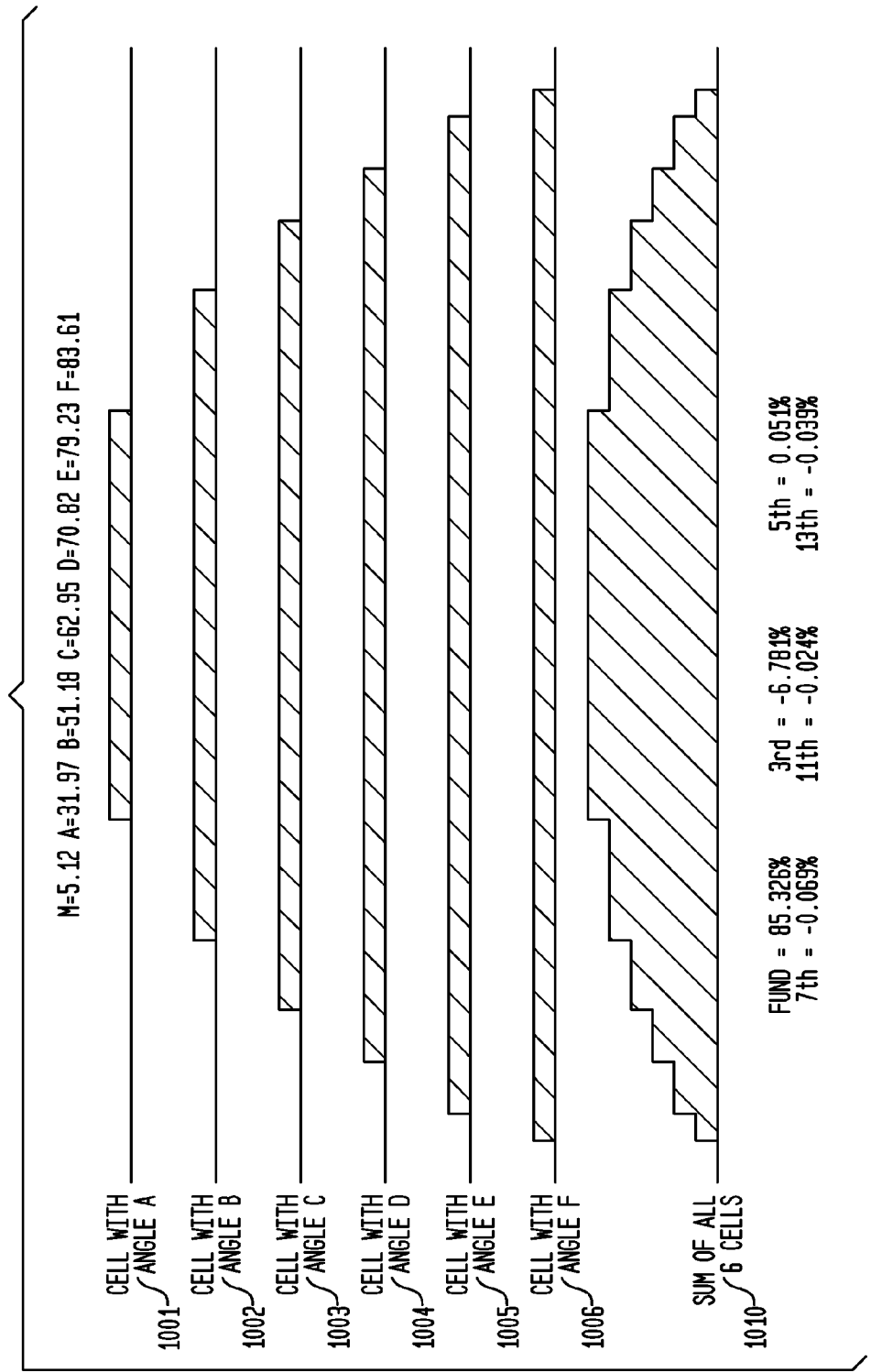
FIGS. 10-14 illustrate the output voltages of six cells in a phase-group of a power supply according to various embodiments.
Figure 11:
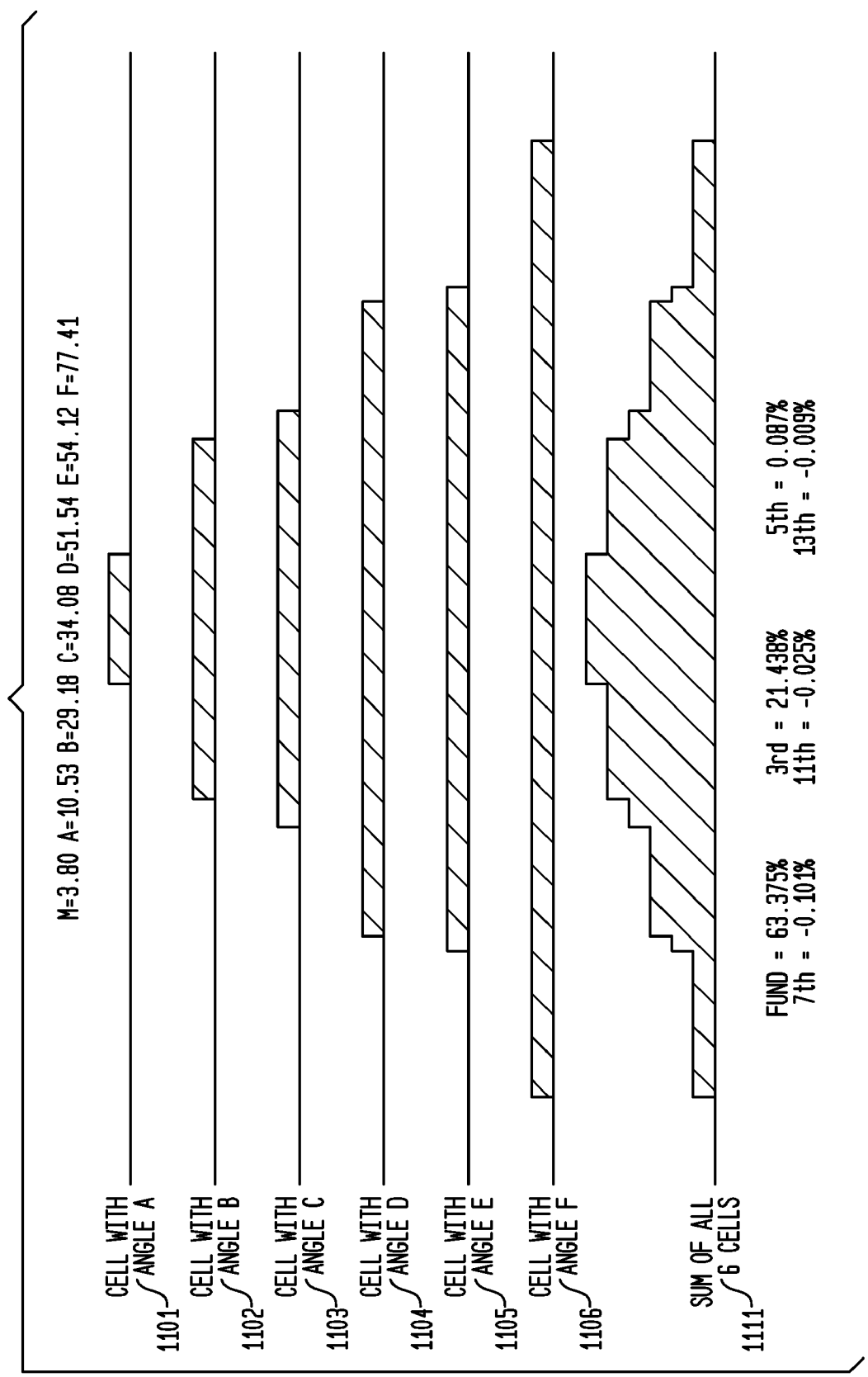
Figure 12:
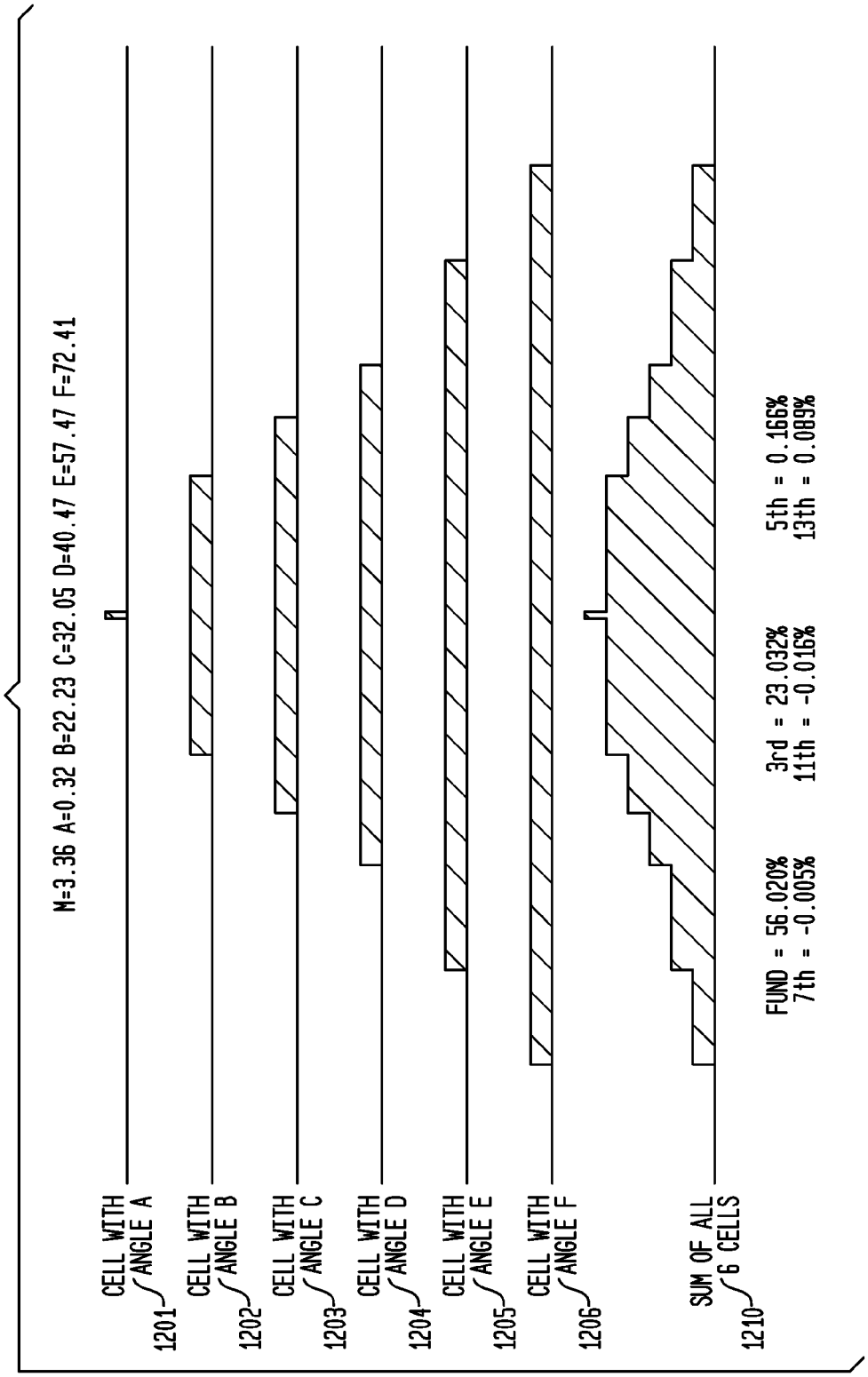
Figure 13:
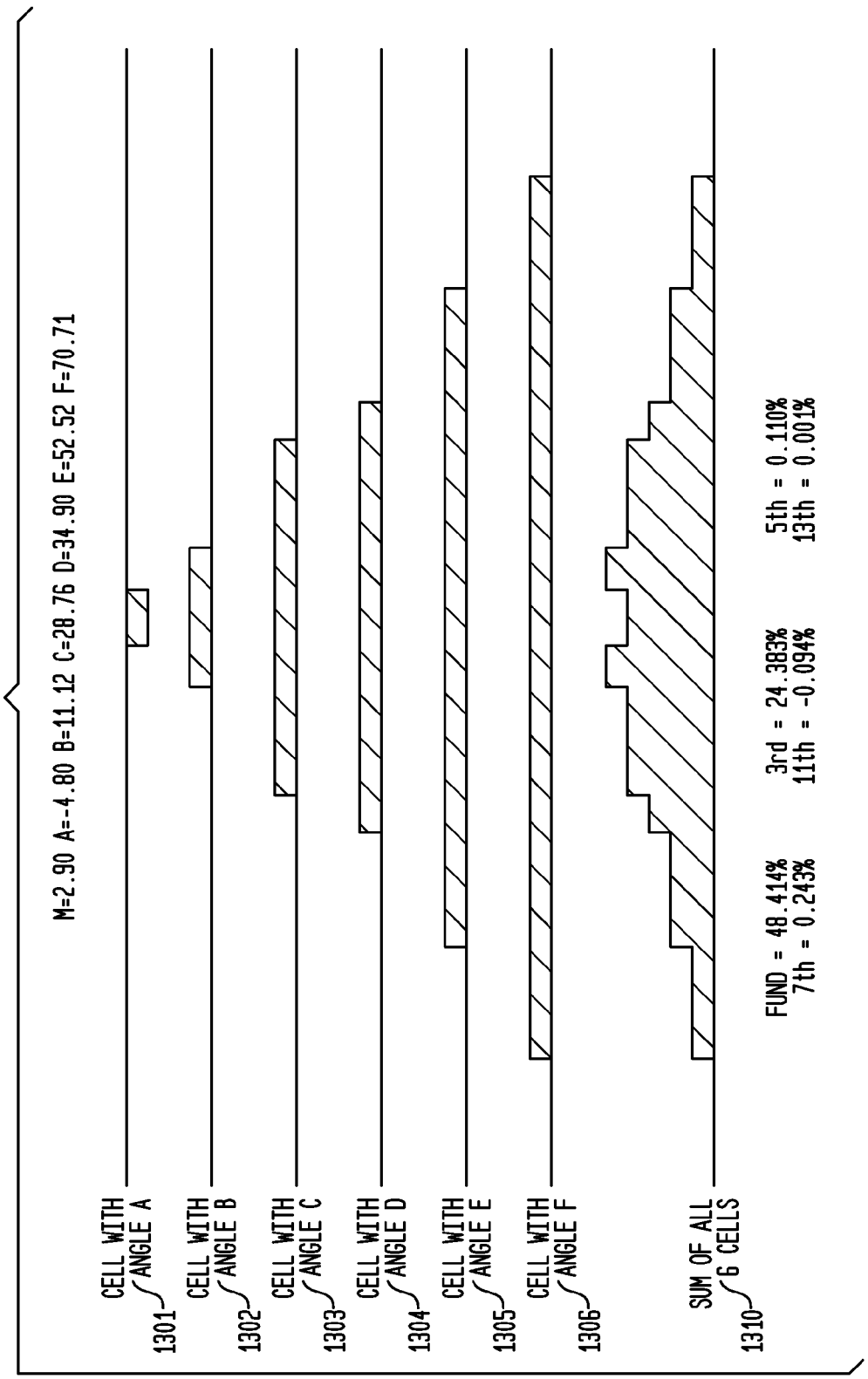
Figure 14:
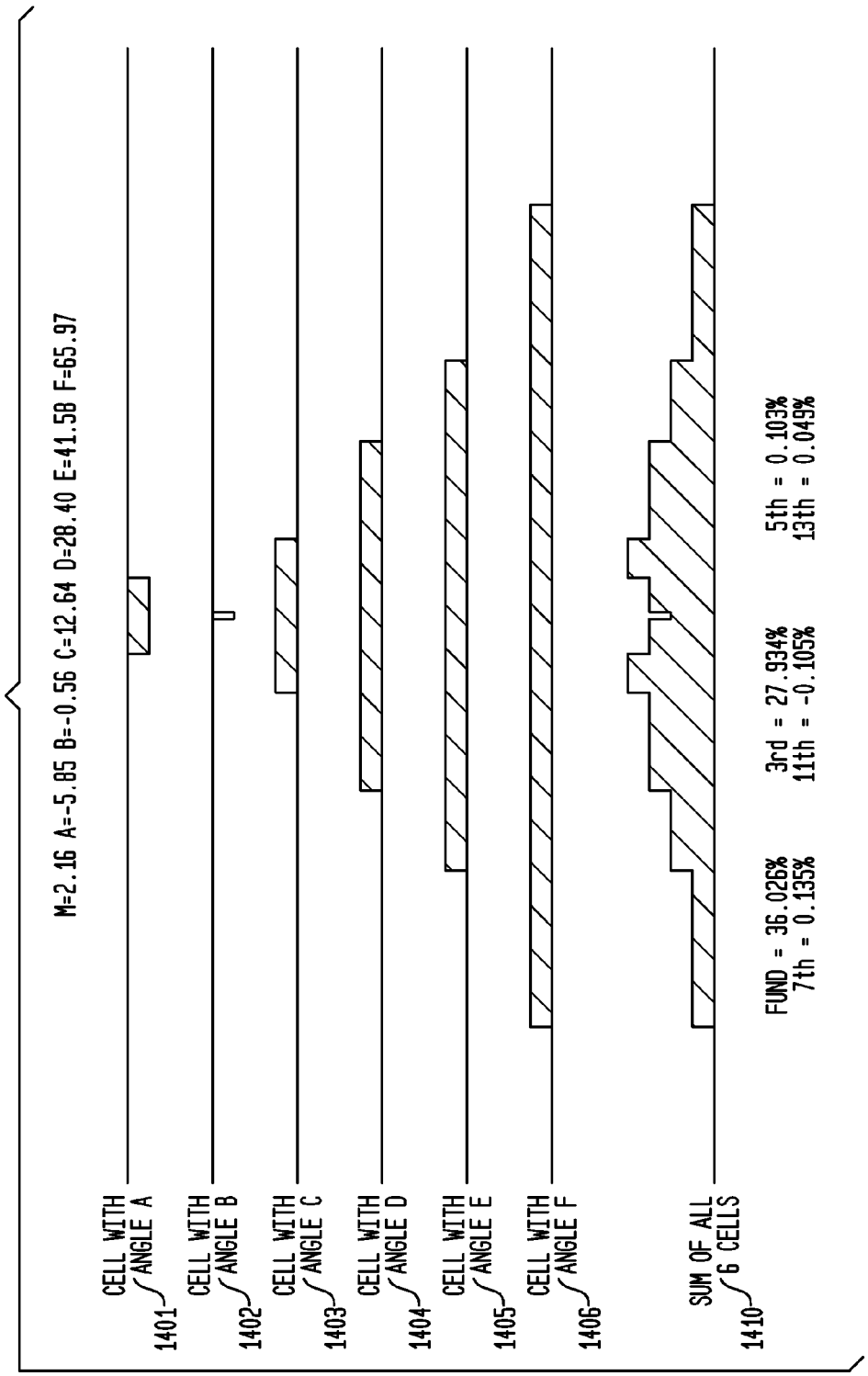

FIG. 10 shows the angles, waveforms 1001-1006 and resulting sum 1010 found to produce a fundamental (wanted) voltage at 85% of its maximum value, while the $5^{th}$, $7^{th}$, $11^{th}$, and $13^{th}$ harmonic (unwanted) voltages are all below 0.07%. FIG. 11 shows the angles, waveforms 1101-1106 and resulting sum 1110 found to produce a fundamental (wanted) voltage at 63% of its maximum value, while the $5^{th}$, $7^{th}$, $11^{th}$, and $13^{th}$ harmonic (unwanted) voltages are all below 0.11%. FIG. 12 shows the angles, waveforms 1201-1206 and resulting sum 1210 found to produce a fundamental (wanted) voltage at 56% of its maximum value, while the $5^{th}$, $7^{th}$, $11^{th}$, and $13^{th}$ harmonic (unwanted) voltages are all below 0.17%. FIG. 13 shows the angles, waveforms 1301-1306 and resulting sum 1310 found to produce a fundamental (wanted) voltage at 48% of its maximum value, while the $5^{th}$, $7^{th}$, $11^{th}$, and $13^{th}$ harmonic (unwanted) voltages are all below 0.25%. FIG. 14 shows the angles, waveforms 1401-1406 and resulting sum 1410 found to produce a fundamental (wanted) voltage at 36% of its maximum value, while the $5^{th}$, $7^{th}$, $11^{th}$, and $13^{th}$ harmonic (unwanted) voltages are all below 0.14%.

The waveforms generated by utilizing the above-described SHE method and shown in FIGS. 8 and 10-14 can produce power quality at the output of the power supply as good as those produced with PWM control having a switching frequency four times the fundamental (wanted) frequency, and with lower switching losses. However, as described in more detail below, the input power quality will not generally be as good as with PWM control and some of the angles may take on negative values below a certain value of the fundamental.

With the SHE method, each power cell is producing a different amount of fundamental voltage. Since all of the power cells in each series-connected phase group are carrying the same current, they are also producing a different amount of power. As described above, the harmonic cancellation at the primary winding 112 of transformer 110 (see FIG. 1) depends on all of the power cells carrying an equal share of the load power. As this is not the case with the SHE method, the input power quality with the SHE method will generally not be as good as with PWM control.

With the SHE method, as shown in FIG. 9, some of the angles may take on negative values. In FIG. 13 it is clear that angle A is negative, because the pulse 1301 from the corresponding cell is negative during the positive half-cycle. In FIG. 14 both angles A and B are negative, as their pulses 1401, 1402 are negative. Thus, unlike the method described in the Chiasson paper, where negative angles were not allowed and there were gaps in the solutions obtained, the converging searches associated with FIG. 9 allowed negative angles. An implementation of negative angles is shown, for example, in FIG. 15.

Figure 15:
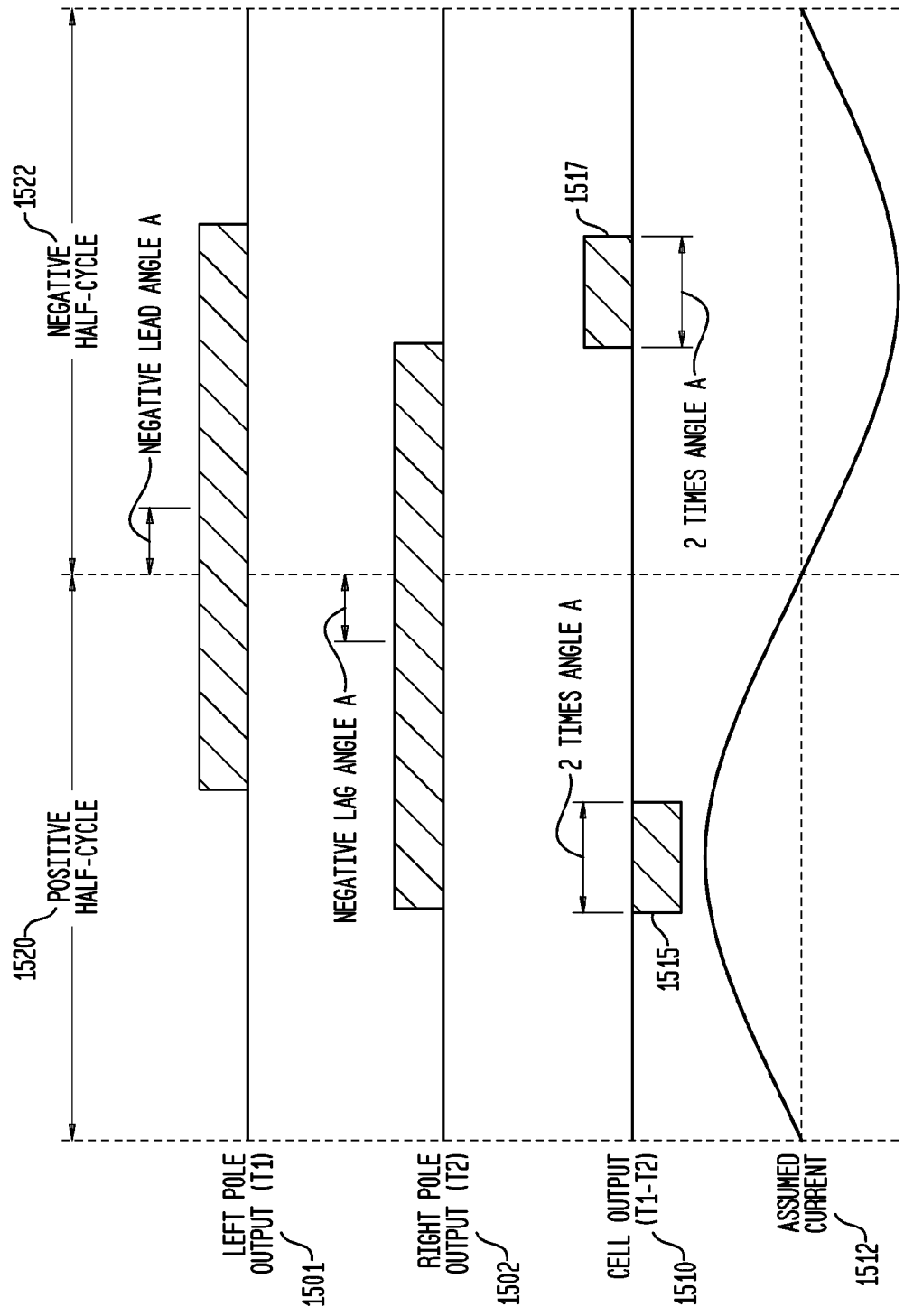
FIG. 15 illustrates a selective harmonic elimination (SHE) control pattern according to various embodiments.

Recall that in FIG. 7 a positive control angle implied that the left pole (T1) 701 is advanced by the control angle, while the right pole (T2) 702 is retarded by the same control angle. The result was that the output voltage from the cell (T1-T2) 710 consisted of a positive pulse 715 of duration twice the control angle at the center of the positive half-cycle 770, and a negative pulse 717 of duration twice the control angle at the center of the negative half-cycle 722. For the remainder of the cycle the output voltage from the cell was zero. FIG. 15 shows that a negative control angle implies that the left pole (T1) 1501 has a negative advance, or is retarded by the control angle, while the right pole (T2) 1502 has a negative retard, or is advanced by the same control angle. The result is that the output voltage from the cell (T1-T2) 1510 is a negative pulse 1515 of duration twice the control angle at the center of the positive half-cycle 1520 where current 1512 is positive, and a positive pulse 1517 of duration twice the control angle at the center of the negative half-cycle 1522 where current 1512 is negative. For the remainder of the cycle the output voltage from the cell is zero.

However, as shown in FIG. 15, with a negative control angle, the cell produces negative voltage 1515 while the load current 1512 is positive, and produces positive voltage 1517 while the load current is negative 1512. In both cases, power flows from the load into the cell. When a power cell is configured as shown in FIG. 2, where the power cell 210 includes a diode rectifier 212, the power cell is not configured to return power to the dedicated secondary winding.

For each power cell that might receive negative angle commands, configuring the power cell with a regenerative rectifier in lieu of a diode rectifier would allow the power cell to return power to the dedicated secondary winding. However, such a configuration adds considerable cost and complexity to the power cell.

Concerns with each power cell producing a different amount of power, and with some angles taking on negative values, can be overcome by rotating the assignment of the angle commands among the power cells. Thus, a regenerative rectifier is not required.

Since the output voltage from each phase-group is the sum of the voltages from all six cells, it does not matter which cell is assigned to implement each individual angle command. Therefore, the six angles are initially assigned at random to the six cells in each phase-group. Then after an interval of operation, the angles are re-assigned in a new pattern, such that no cell is assigned an angle it had already been given during the previous five patterns. This process is repeated continuously at equal intervals. After six intervals, the pattern will repeat, and every cell will have generated the same average share of the load power. Therefore, the harmonic cancellation at the primary winding of transformer will be restored. With each cell producing the same fractional share of the load power (which is positive), each fractional share will also be positive, and no cell requires a regenerative rectifier.

With rotation of the assignment of the angle commands, the average power from each of the cells during one complete rotation cycle will be equal, but the power from each cell will fluctuate Within the rotation cycle. For such configurations, the capacitor (214 in FIG. 2) may be sized to provide enough filtering so that these fluctuations do not affect the flow of power into the cell. In particular, the capacitor 214 may be sized to be capable of storing the energy absorbed during an interval with a negative angle command, so that the stored energy can later be consumed during an interval with a positive angle command. Capacitor 214 may be sized to store this energy without charging to an excessive voltage level. The charging can be limited by avoiding patterns with consecutive negative angle commands, and by making the rotation period as short as possible. As described hereinafter, the assignment interval can be less than or equal to one cycle of the output frequency, so that the rotation period does not exceed one cycle of the output frequency multiplied by the number of cells per phase-group. In various implementations, the assignment interval can be equal to one-half cycle of the output frequency.

In general, the power cells may be configured the same as power cells used for normal 50/60 hertz PWM applications, so that they will already have enough filtering to handle the normal ripple current at these low frequencies. For high-frequency applications, using the above-described SHE method, this normal filtering will generally be sufficient.

Figure 16:
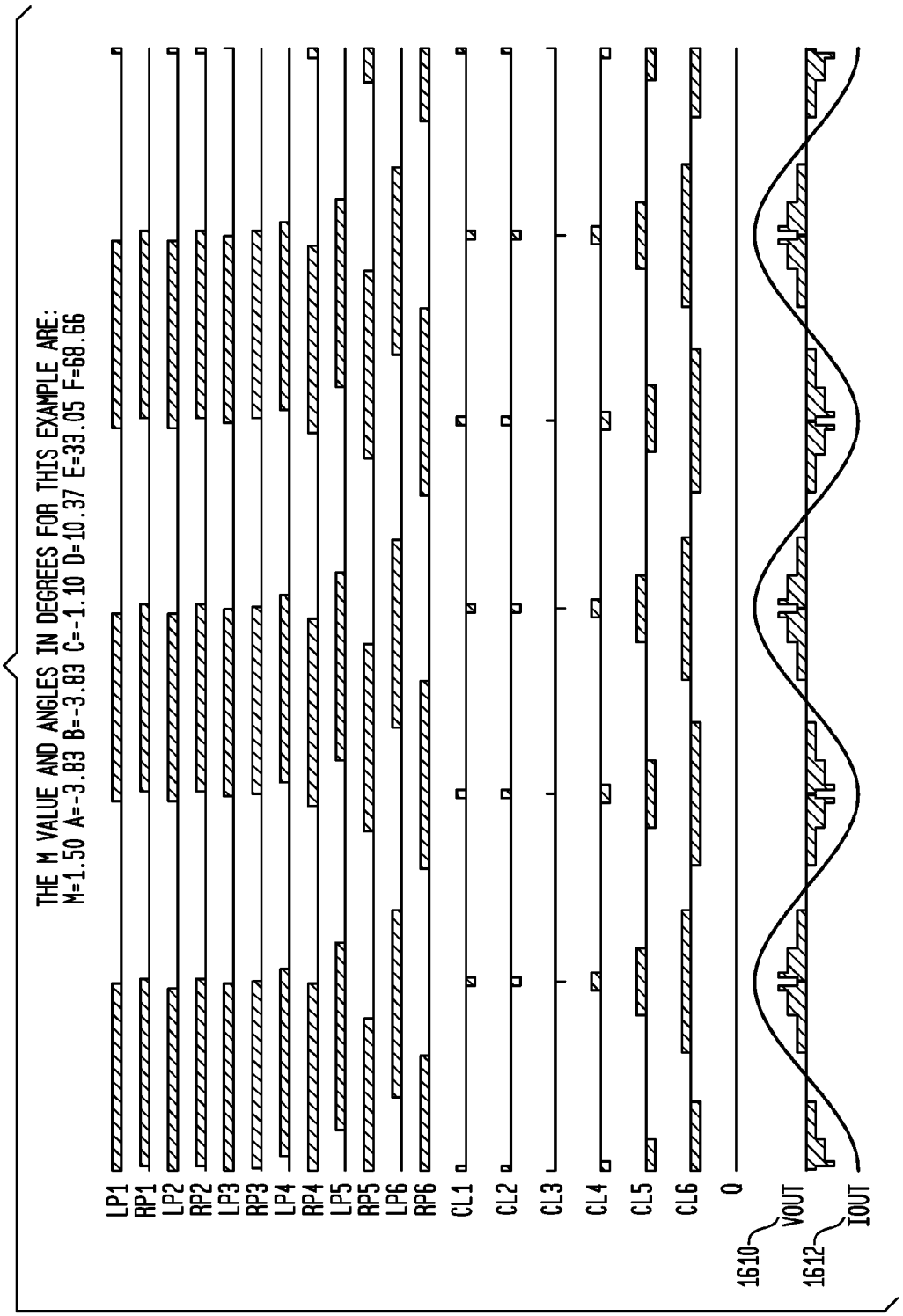
FIG. 16 illustrates exemplary waveforms from one cell group using SHE control without angle duty rotation.

FIG. 16 illustrates exemplary waveforms from one cell group (i.e., six power cells) using SHE control without angle duty rotation. For FIG. 16, a set of angles A-F were chosen that produce only 25% of maximum fundamental voltage, for which three of the angle commands (A, B, and C) are negative. This particular set of angles are from a different solution not shown on FIG. 9.

The top portion of FIG. 16 shows the waveforms of both poles of every cell in a phase-group, over an interval of three cycles. The left pole of the first cell is labeled LP1, and the right pole of the first cell is labeled RP1. The respective left and right poles of the additional cells are labeled RP2-RP6 and LP2-LP6. Each pole of each cell is generating a symmetrical square-wave of voltage.

FIG. 16 also shows the output voltage of every cell in the phase-group, over the same interval of three cycles. The cells are labeled CL1-CL6. As shown in FIG. 16, the power cells CL1-CL3 produce negative pulses during the positive half-cycles where current 1612 is positive, and positive pulses during the negative half-cycles where current 1612 is negative. The power cells CL4-CL6 produce positive pulses during the positive half-cycles, and negative pulses during the negative half-cycles. The control variable Q controls the rotation of the angle commands, and is therefore inactive in FIG. 16.

The bottom portion of FIG. 16 shows the waveforms of the sum 1610 of the output voltage from all six cells, and the assumed waveform of the output current (with unity power factor and no harmonics). The waveform 1610 is illustrated as assumed, as actual output current 1612 may have different power factor and harmonics. For the SHE method associated with FIG. 16, the average power produced or absorbed by each cell will be different, and will be negative for the first three cells. Also, the average currents in the IGBTs and in the anti-parallel diodes in the left pole and in the right pole of each of the six cells will be different for each cell.

Figure 17:
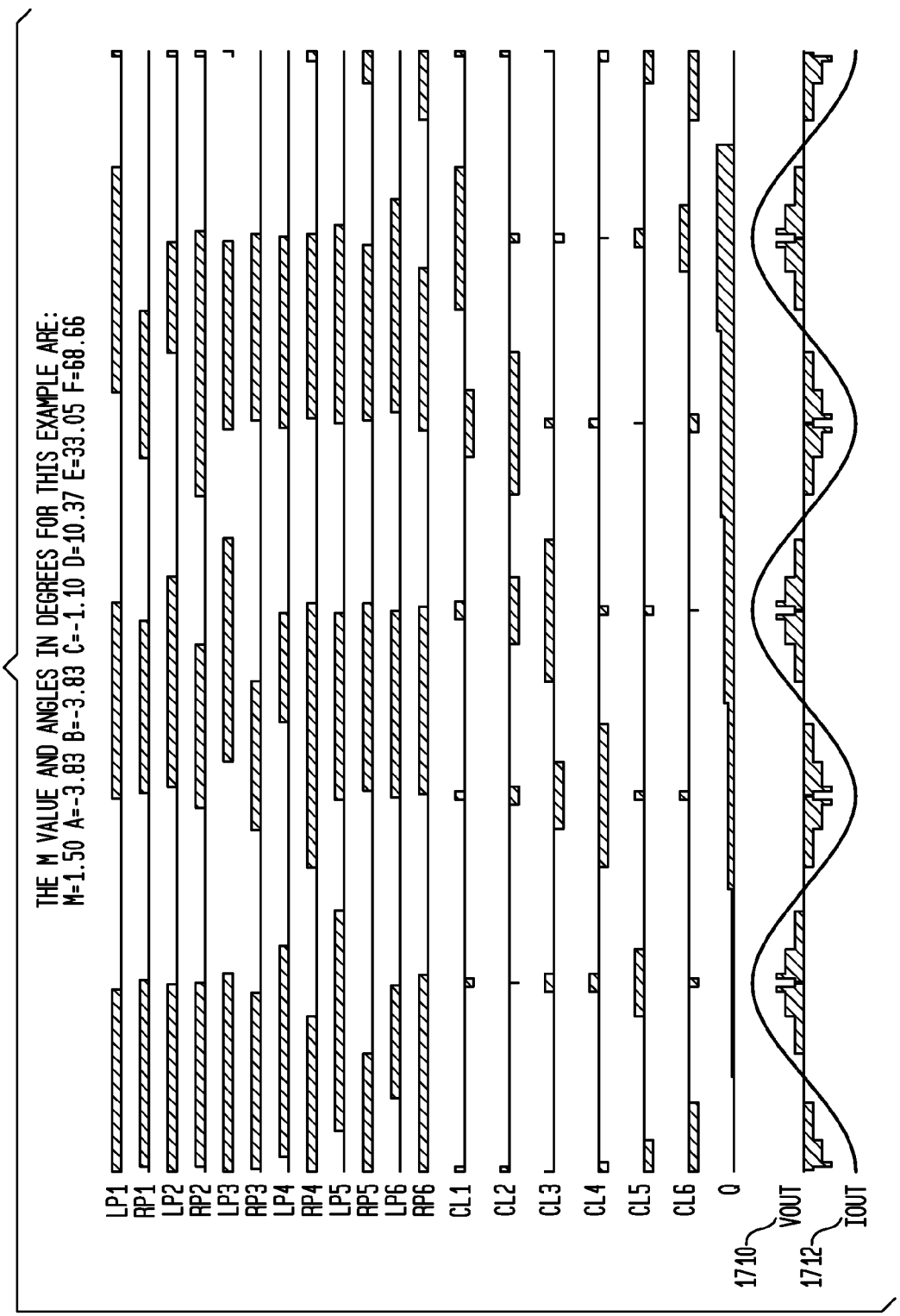
FIG. 17 illustrates exemplary waveforms from one cell group using SHE control with angle duty rotation.

FIG. 17 illustrates exemplary waveforms from one cell group (i.e., six power cells) using SHE control with angle duty rotation. FIG. 17 utilizes the same set of angles utilized in FIG. 16. With respect to SHE method associated with FIG. 17, the angle command assignment is rotated at the end of each half-cycle. Thus, a complete rotation occurs every six half-cycles (or three full cycles).

The top portion of FIG. 17 shows the waveforms of both poles of every cell in a phase-group, over an interval of three cycles. The labeling is the same as in FIG. 16. Each pole of each cell is still switching positive and negative once per cycle as in FIG. 16, but the square-waves of voltage are no longer symmetrical as in FIG. 16.

FIG. 17 also shows the output voltage 1710 of every cell in the phase-group, over the same interval of three cycles. The labeling is the same as in FIG. 16. Each cell produces pulses of six different durations during the three-cycle period, instead of six pulses of the same duration as in FIG. 16. Each cell produces three pulses with negative angles, and three pulses with positive angles during the three-cycle period. The patterns produced by power cells CL1, CL3 and CL5 are identical except for a displacement of one cycle. The patterns produced by power cells CL2, CL4, and CL6 are also identical except for a displacement of one cycle, and match the patterns produced by power cells CL1, CL3, and CL5 except for having opposite polarity.

The control variable Q controls the rotation of the angle assignments, and unlike in FIG. 16, Q steps through six different values during the three-cycle period. The steps occur at the end of each half-cycle, and because all the poles have the same values at those points, the rotation will not cause extra switching events.

The bottom portion of FIG. 17 shows the waveforms of the sum of the output voltage 1710 from all six cells, and the waveform of the output current 1712. The sum of the output voltages 1710 is identical to FIG. 16, because as previously stated it does not matter which cell is assigned to implement each individual angle command.

For the SHE method associated with FIG. 17, the average power produced or absorbed by each of the six cells will be equal, and will be positive for all six cells. Also, the average currents in the IGBTs and in the anti-parallel diodes in the left pole and in the right pole of each of the six cells will not necessarily be equal, but will have much less variation than without rotation. Additionally, the average currents in the left poles of cells CL1, CL3, and CL5 will be equal to the average currents in the right poles of cells CL2, CL4, and CL6; and vice-versa. This dichotomy occurs because the switching patterns produced by cells CL1, CL3, and CL5 have opposite polarity from the switching patterns produced by cells CL2, CL3, and CL6.

Figure 18:
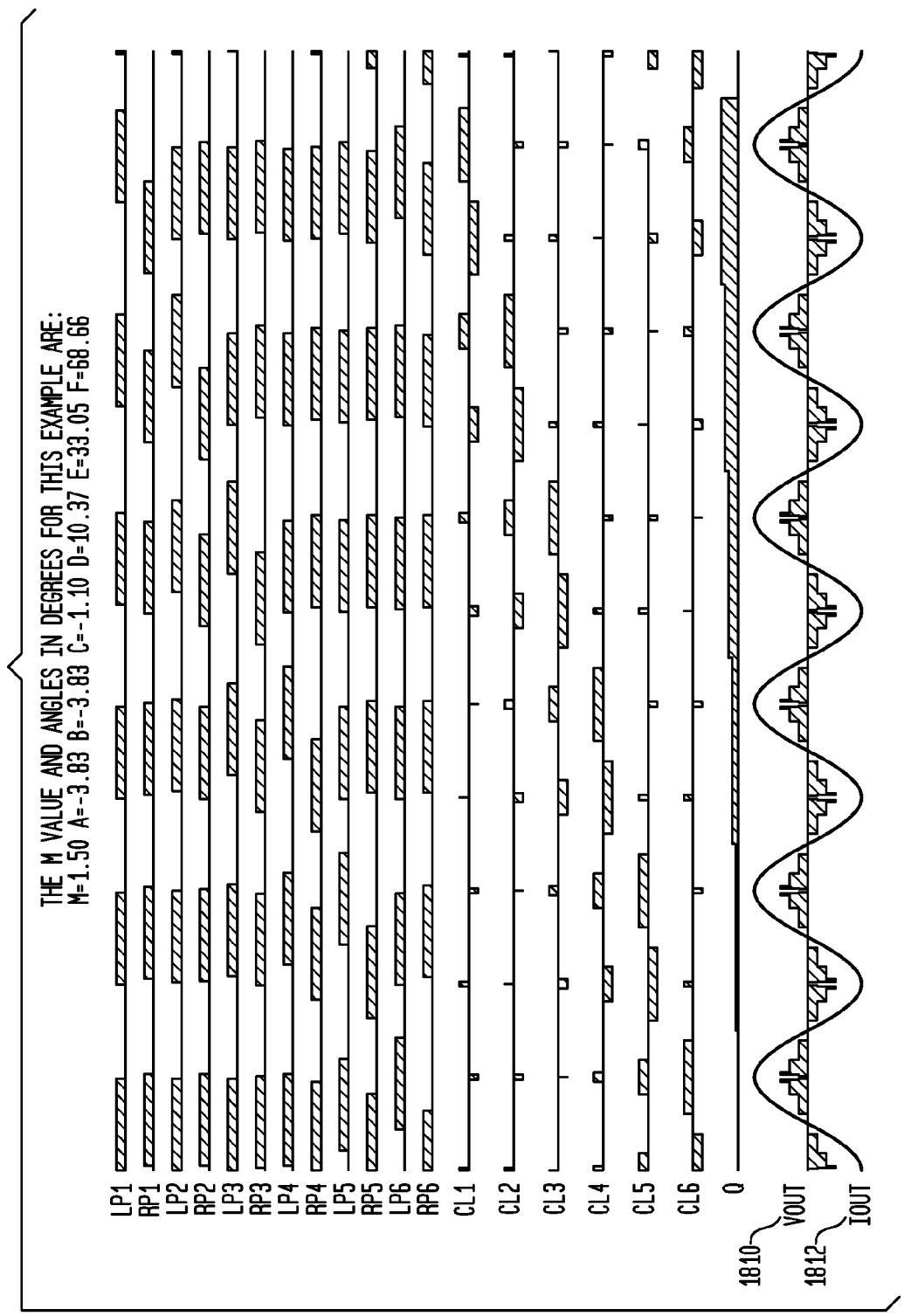
FIG. 18 illustrates exemplary waveforms from one cell group using SHE control with angle duty rotation.

FIG. 18 illustrates exemplary waveforms from one cell group (i.e., six power cells) using SHE control with angle duty rotation. FIG. 18 utilizes the same set of angles as FIG. 17, and shows the waveforms over an internal of six cycles. With respect to the SHE method associated with FIG. 18, the angle assignment is rotated at the end of each full-cycle instead of each half-cycle as in FIG. 17. Thus, a complete rotation occurs every six full-cycles.

The top portion of FIG. 18 shows the waveforms of both poles of every cell in a phase-group, over an interval of six cycles. The labeling is the same as in FIGS. 16 and 17. Each pole of each cell is still switching positive and negative once per cycle as in FIGS. 16 and 17, but the square-waves of voltage are no longer symmetrical as in FIG. 16. However, after six cycles each pole of each cell has spent half of the total time at a positive level and half at a negative level.

FIG. 18 also shows the output voltage of every cell in the phase-group, over the same interval of six cycles. The labeling is the same as in FIGS. 16 and 17. Each cell produces two pulses each of six different durations during the six-cycle period, one positive pulse and one negative pulse of each duration. Each cell produces six pulses with negative angles, and six pulses with positive angles during the six-cycle period. The patterns produced by all the cells are identical except for a displacement of one cycle.

The control variable Q controls the rotation of the angle assignments, and steps through six different values during the six-cycle period. The steps occur at the end of each full-cycle, and because all the poles have the same values at those points, the rotation will not cause extra switching events.

The bottom portion of FIG. 18 shows the waveforms of the sum of the output voltage 1810 from all six cells, and the assumed waveform of the output current 1812. The sum of the output voltages 1810 is identical to FIGS. 16 and 17, because as previously stated it does not matter which cell is assigned to implement each individual angle command.

For the SHE method associated with FIG. 18, the average power produced or absorbed by each of the six cells will be equal, and will be positive for all six cells. Also, the average currents in the IGBTs and in the anti-parallel diodes in the left pole and in the right pole of each of the six cells will be equal for all cells, and the average currents in the anti-parallel diodes will be equal for all cells.

Figure 19:
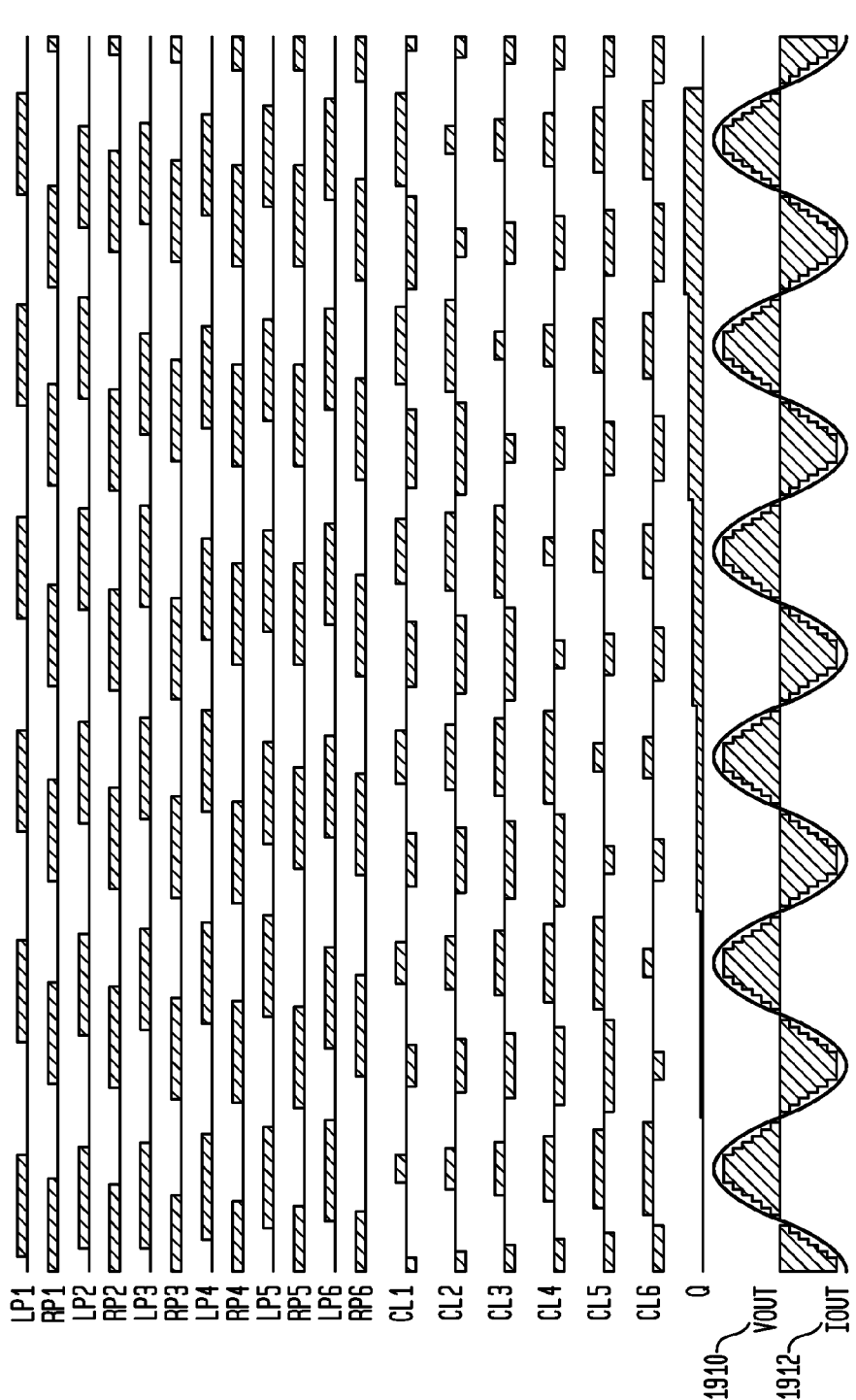
FIG. 19 illustrates exemplary waveforms from one cell group using SHE control with angle duty rotation.

FIG. 19 illustrates exemplary waveforms from one cell group (i.e., six power cells) using SHE control with angle duty rotation. FIG. 19 is identical to FIG. 18, except that FIG. 19 uses a set of angles that produce 74% fundamental voltage, and have no negative angles. For the SHE method associated with FIG. 19, the average power from each cell was equal, and was positive for all six cells. Also, the average currents in the IGBTs were equal for all the cells, and the average currents in the anti-parallel diodes were equal for all the cells.

The bottom portion of FIG. 19 shows the waveforms of the sum of the output voltage 1910 from all six cells, and the assumed waveform of the output current 1912. FIG. 19 demonstrates that angle command rotation every full-cycle maintains equal average powers among the cells, and also equal currents among all the cell IGBTs, and also equal currents among all the cell anti-parallel diodes, whether negative angles are present or not.

Angle command rotation either every half-cycle or every full-cycle will achieve equal average power for all cells, and either will therefore achieve good harmonic current cancellation at the primary of transformer. For applications where the power supply can tolerate some variation in the average currents of the IGBTs and the anti-parallel diodes, the SHE method may utilize a rotation every half-cycle to realize the shortest possible rotation period and the least energy storage required for capacitor (214 in FIG. 2). However, if it is necessary to insure equal average currents for the IGBTs and the anti-parallel diodes, the SHE method may utilize a rotation every full-cycle.

The forgoing has described the use of SHE waveforms that allow a switching frequency equal to the wanted frequency, so that each switching device turns ON and OFF only once per cycle. These SHE waveforms provide only one degree of freedom per cell. With only one degree of freedom per cell, a minimum of five cells may be needed to control the fundamental amplitude of the output voltage from the power supply and also to eliminate four harmonics with these waveforms. In some applications, six cells per phase may need to be employed to find a continuous solution for the switching angles. However, in many applications, the required maximum output voltage could permit a smaller number of cells per phase, which could result in a smaller cost. For such applications, SHE waveforms that provide more than one degree of freedom per cell may be utilized to control the fundamental amplitude of the output voltage from the power supply and also to eliminate harmonics. The number of harmonics eliminated may vary.

Figure 20:
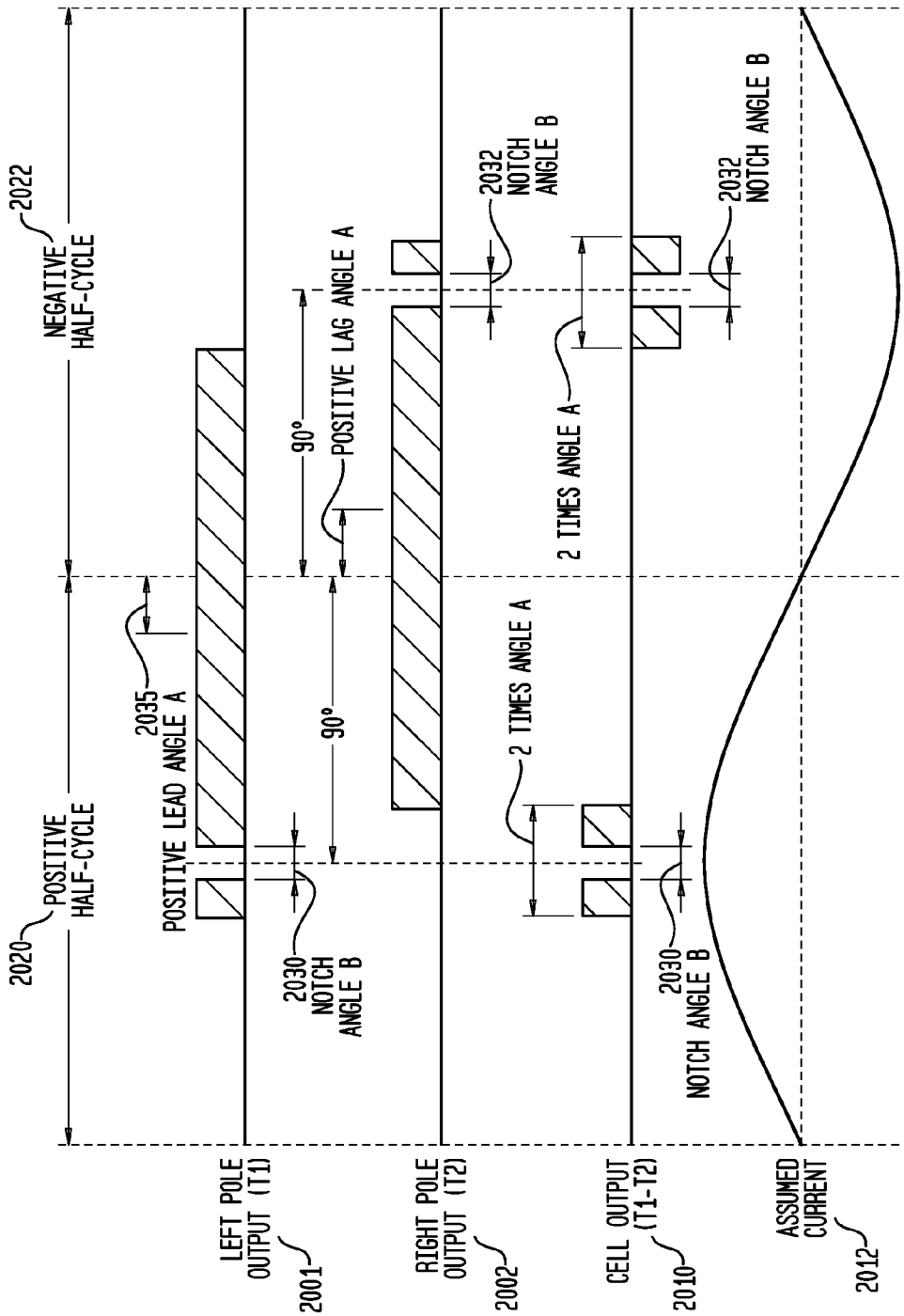
FIG. 20 illustrates a selective harmonic elimination (SHE) control pattern according to various embodiments.

FIG. 20 illustrates a selective harmonic elimination (SHE) control pattern according to various embodiments. In FIG. 20, the switching frequency is equal to twice the wanted frequency. The SHE control pattern of FIG. 20 is nearly identical to that of FIG. 7, except that a notch of duration angle B 2030 is inserted into the middle of the positive half-cycle 2020 of the left pole output T1 2001, and an identical notch 2032 is also inserted into the middle of the negative half-cycle 2022 of the right pole output T2 2002. With these notches inserted, both the left pole and the right pole switch twice per cycle instead of once per cycle. The notches cause the cell output (T1-T2) 2010 to contain two pulses in each half-cycle instead of only one pulse. The duration and location of these two pulses are determined both by angle A 2035 and by angle B 2030/2032, so that there are two degrees of freedom.

Figure 1:
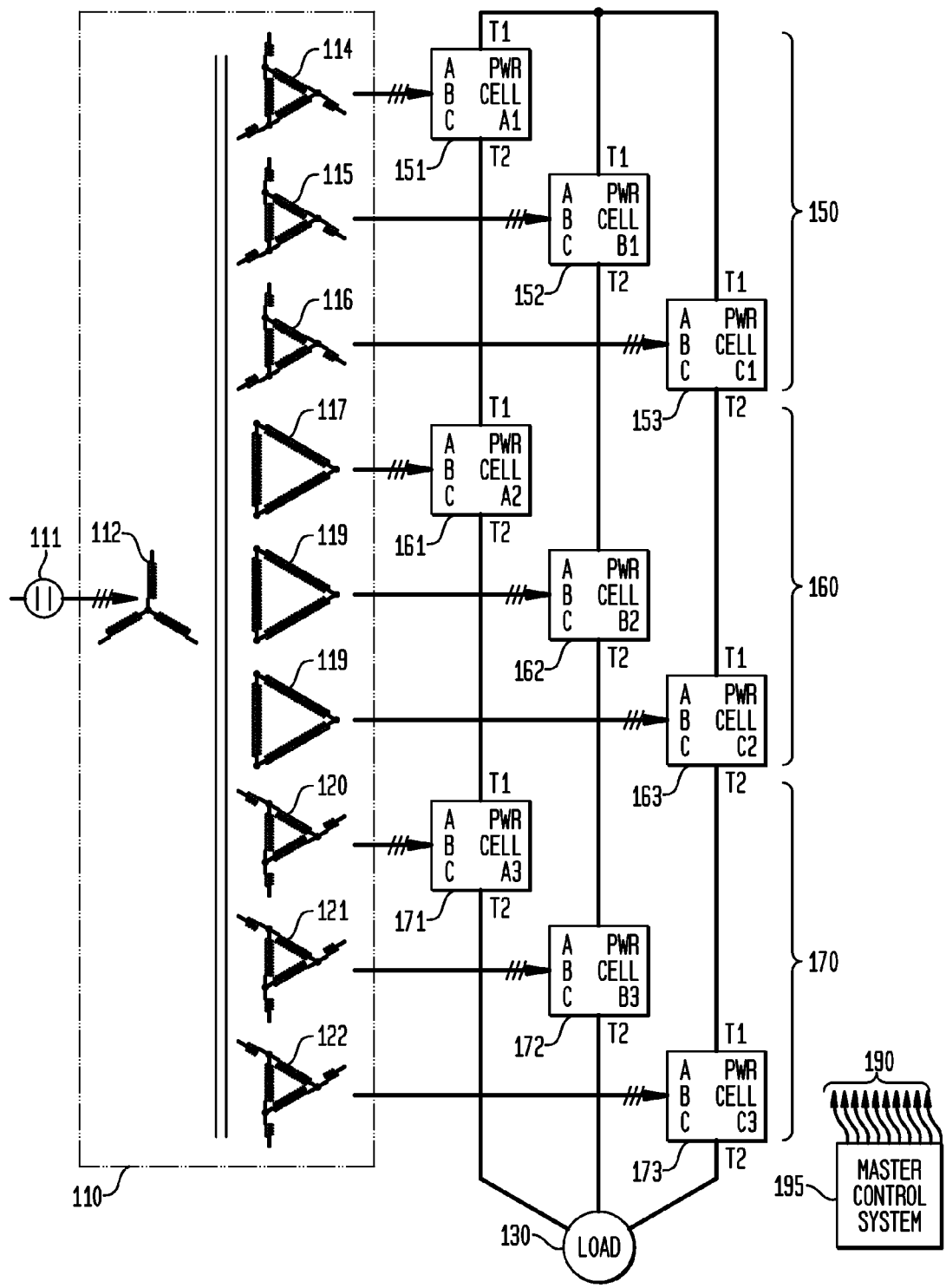
FIG. 1 illustrates various embodiments of a prior art power supply.

If the SHE waveforms of FIG. 20 were used in the cells of FIG. 1, causing them to switch twice per cycle, it would be possible to obtain six degrees of freedom with only three cells per phase. This could permit the same number of harmonics to be eliminated as was previously described for six cells per phase, each switching once per cycle. Such an approach might be a favorable tradeoff for many applications that could tolerate the higher switching frequency, and would still give lower switching losses than with PWM control.

Figure 21:
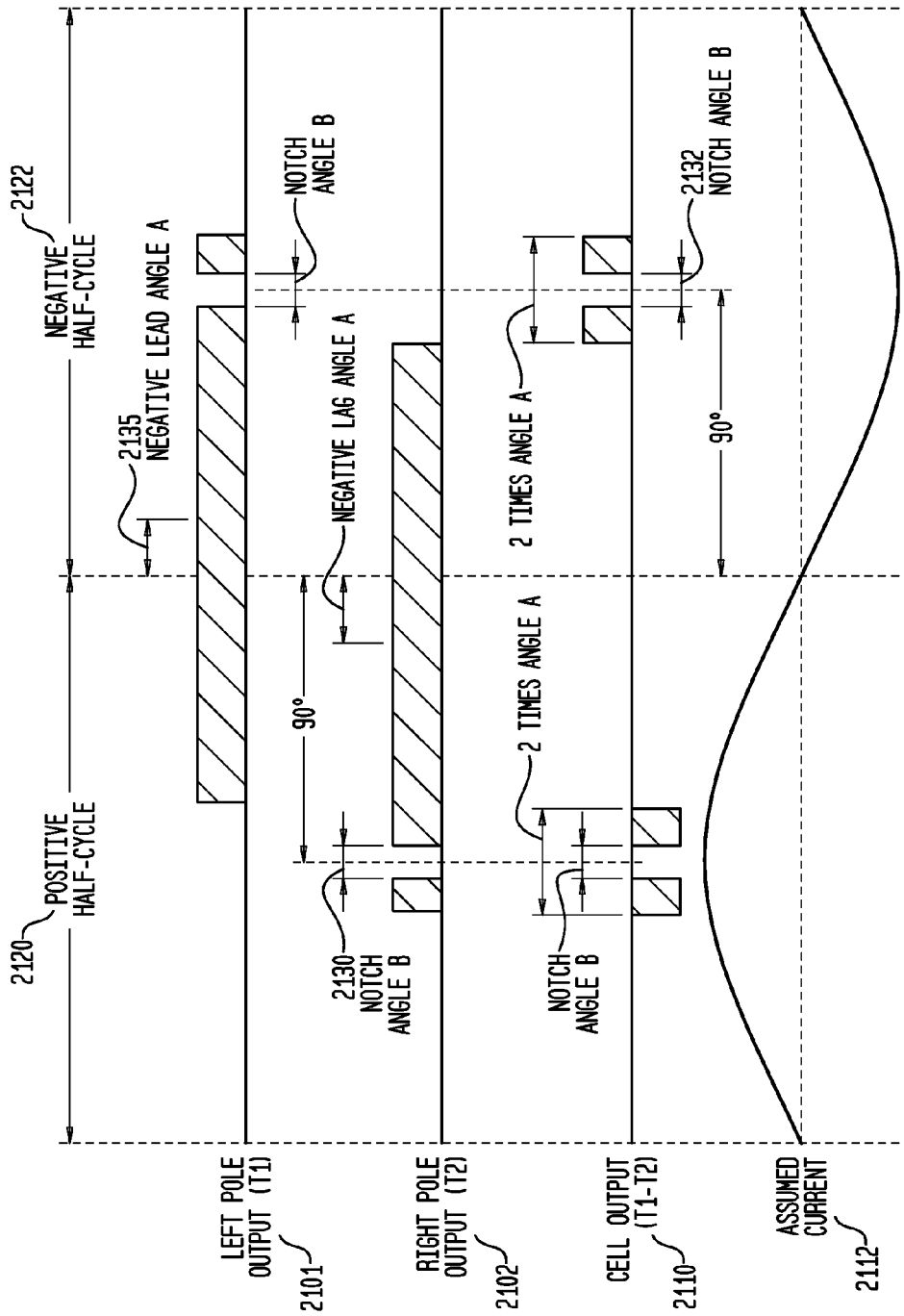
FIG. 21 illustrates a selective harmonic elimination (SHE) control pattern according to various embodiments.

FIG. 21 illustrates a selective harmonic elimination (SHE) control pattern according to various embodiments. The SHE control pattern of FIG. 21 is nearly identical to that of FIG. 20, except that the waveforms of the left pole T1 2101 and the right pole T2 2012 have been exchanged. The cell output (T1-T2) 2110 still contains two pulses in each half-cycle instead of only one pulse, but these pulses have the opposite polarity compared to FIG. 20. Thus, the SHE method associated with FIG. 21 can produce negative power flow.

Figure 22:
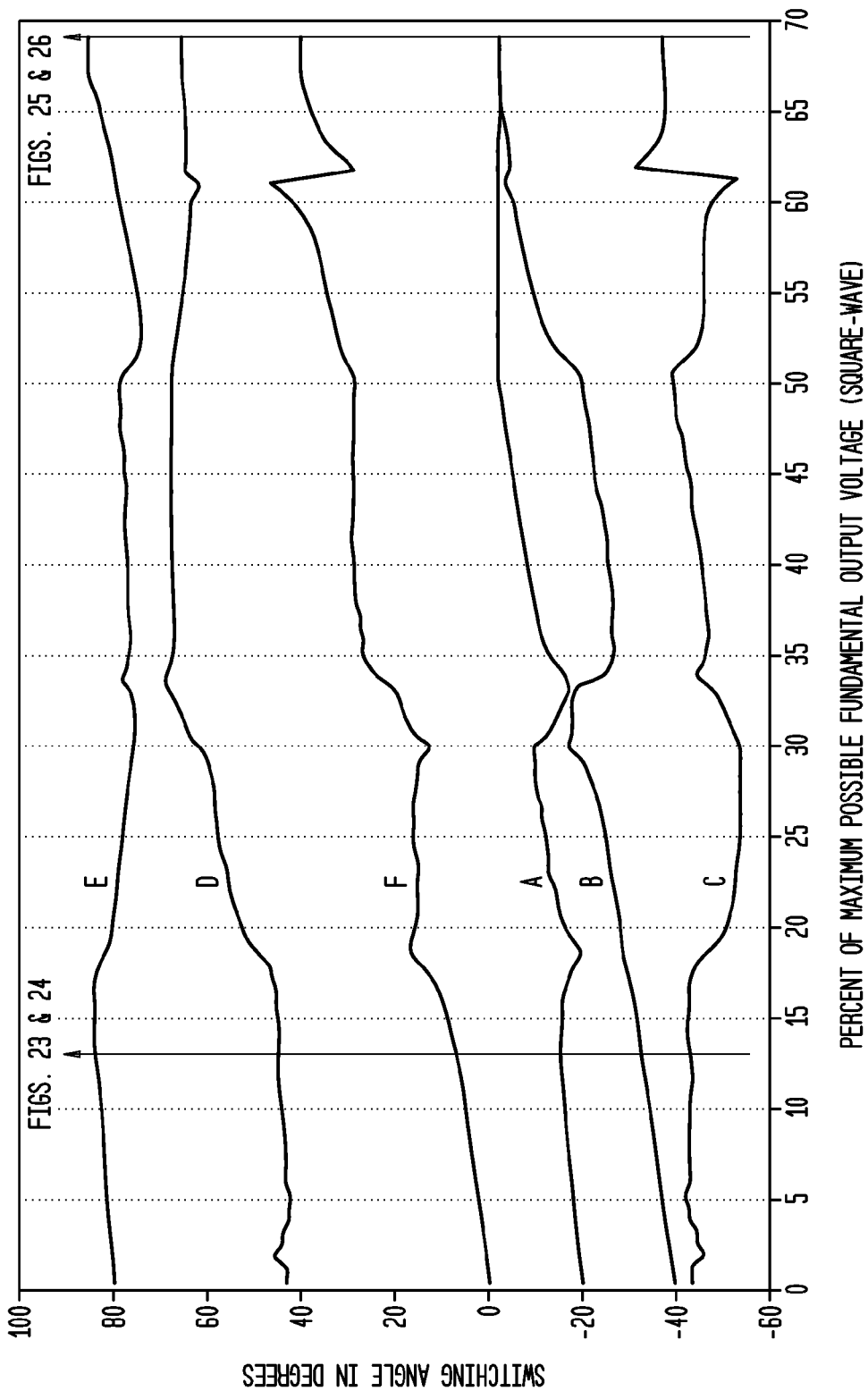
FIG. 22 illustrates results of two converging searches configured to give a desired fundamental while eliminating certain harmonics.

Solutions for the SHE angles may not necessarily exist for all possible values of fundamental (wanted) voltage. FIG. 22 shows the results of two searches, when the computer program was configured to eliminate four harmonics (the $5^{th}$, $7^{th}$, $11^{th}$, and $13^{th}$) utilizing three power cells per phase group. One continuous solution was found between 62% and 0% fundamental voltage, and a second was found between 69% and 62% voltage. These were combined to create FIG. 22.

The angles A-F in FIG. 22 are interpreted as follows: Each cell produces two pulses symmetrically located in each half-cycle. These two pulses can be visualized as one main pulse with a narrower notch in the middle. A notch can be visualized as a pulse of negative width. The first of the three power cells produces a main pulse of width 2*D, with a notch having width −2*A. The second of the three power cells produces a main pulse of width 2*E, with a notch having width −2*B. The third of the three power cells produces a main pulse of width 2*F, with a notch having width −2*C. Because the notch width angles must be negative, there are more constraints than in the searches associated with FIG. 9. Due to the additional constraints, whereas the solutions of FIG. 9 reached a maximum voltage of 87%, the solutions of FIG. 22 only reached a maximum voltage of 69%. If the notch width exceeds the main pulse width, the cell will produce negative pulses during the positive half-cycle, and will have negative power flow.

For better clarity, the waveforms are displayed for the angles A-F plotted in FIG. 22, for two specific values of fundamental voltage. These two specific values are indicated by dotted vertical arrows in FIG. 22, and respectively correspond to FIGS. 23-26. Each of FIGS. 23-26 list a value for "M" (which is proportional to the desired fundamental amplitude), lists the value (in degrees) of the six respective angles A-F, illustrate the output voltages of the three cells (CLa1, CLa2, CLa3) in the A phase-group of a power supply according to various embodiments, illustrate the sum of the cell voltages in the A, B and C phase groups, and illustrates the control variable Q which controls the rotation of the angle commands. Each of FIGS. 23-26 also shows the load voltage from phase A to neutral, and the assumed load current for phase A.

Figure 23:
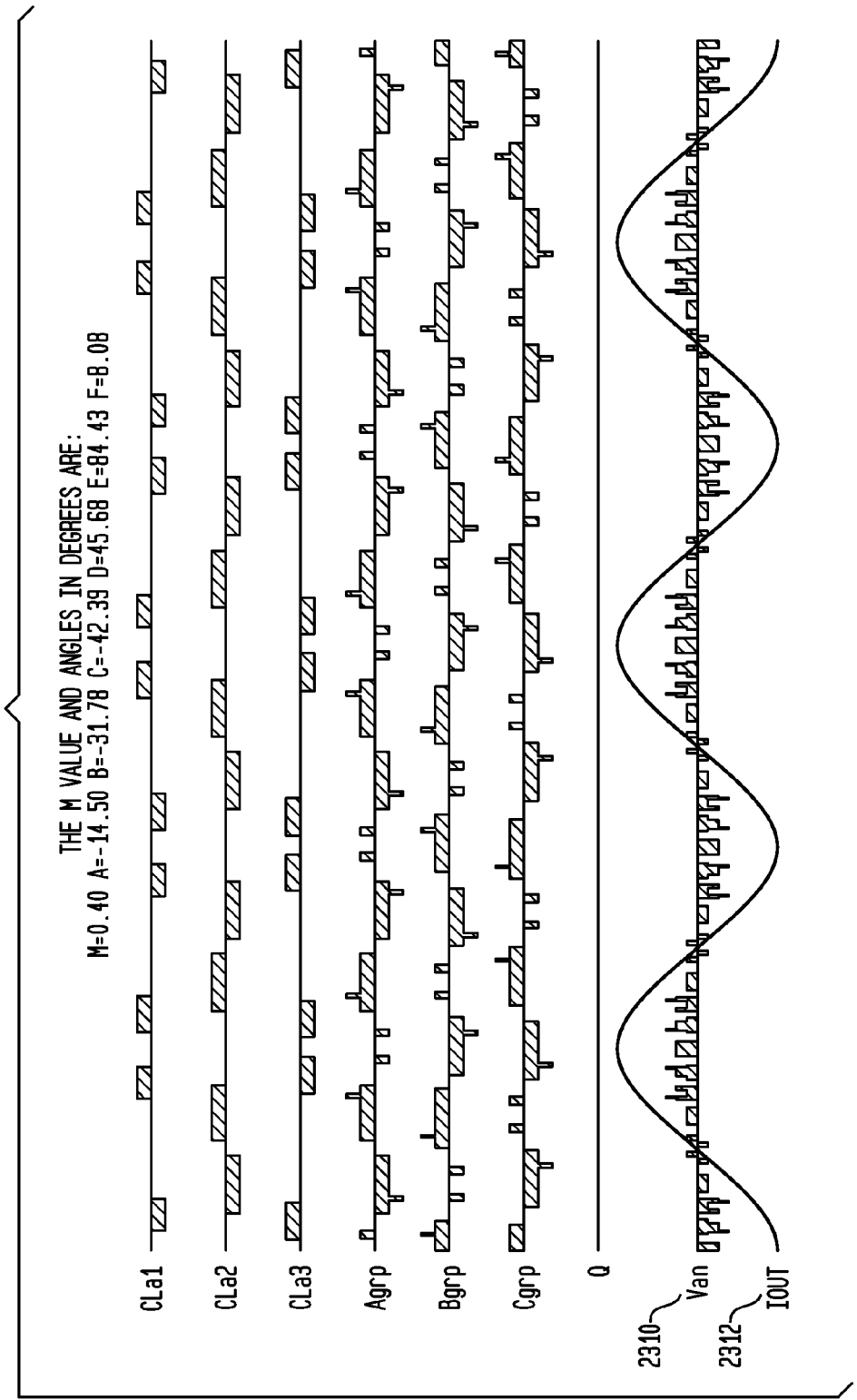
FIG. 23 illustrates exemplary waveforms using SHE control without angle duty rotation.

FIG. 23 shows the waveforms corresponding to 13% of maximum possible fundamental voltage, with no angle command rotation. The output of each A-group cell repeats for each cycle without change, and is different from the other A-group cells. As shown in FIG. 23, the power cell CLa1 is producing positive pulses during the positive half cycle. The power cell CLa2 is also producing positive pulses during the positive half cycle, but of a different duration than those of power cell CLa1. The power cell CLa3 is producing negative pulses during the positive half-cycle, and will have negative power flow. Thus, each of the power cells is producing a different amount of power. The bottom portion of FIG. 23 shows the waveforms of the sum of the output voltage 2310 from all cells, and the assumed waveform of the output current 2312.

Figure 24:
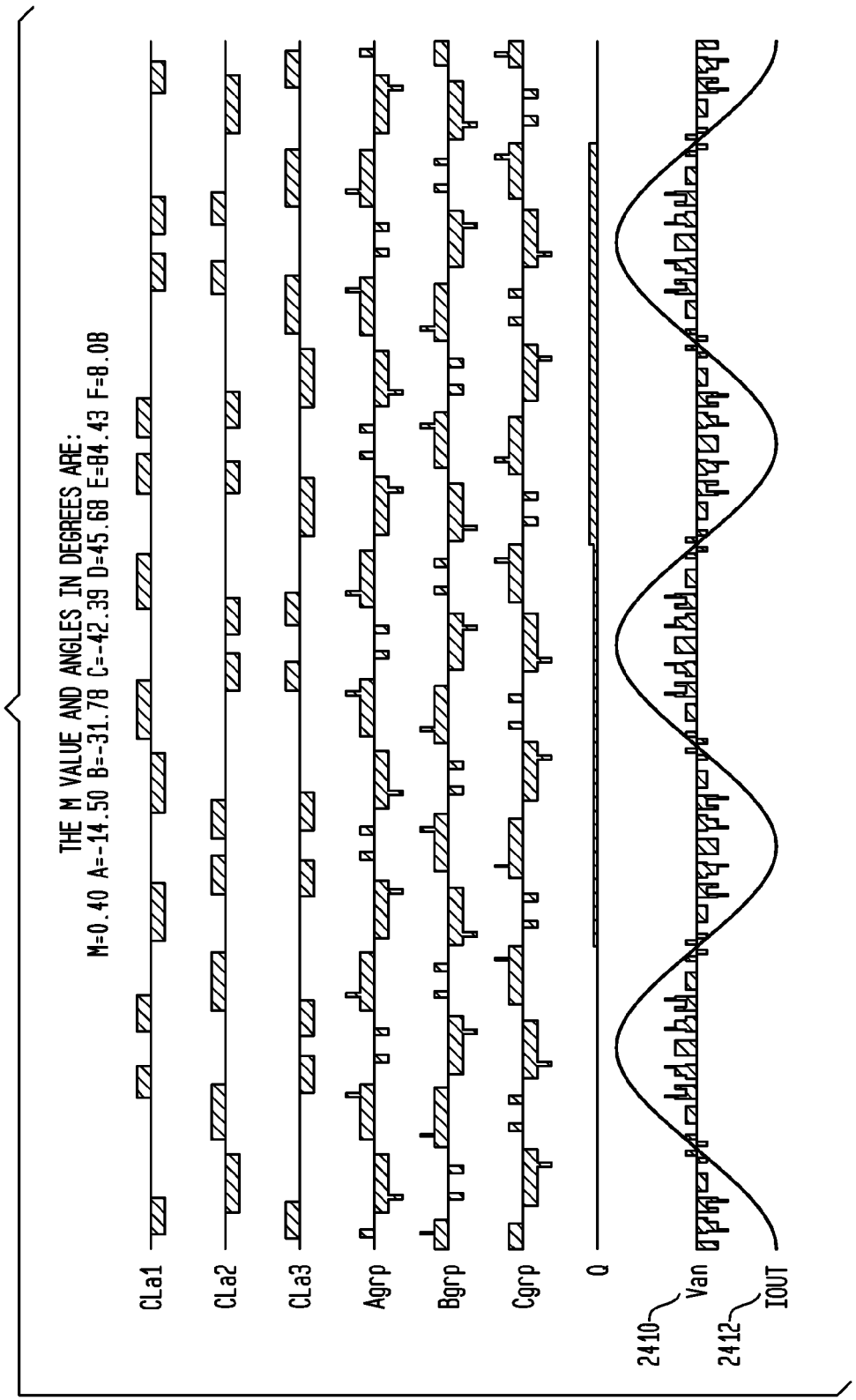
FIG. 24 illustrates exemplary waveforms using SHE control with angle duty rotation.

FIG. 24 also shows the waveforms corresponding to 13% of maximum possible fundamental voltage, but with angle command rotation. The variable Q steps through three successive values during the three-cycle rotation interval, and then the pattern repeats. The steps occur at the end of each full-cycle, and because all the poles have the same values at those points, the rotation will not cause extra switching events. The value of Q is used to determine which SHE waveform is assigned to each cell. The load voltage 2410 from phase A to neutral ($V_{an}$) in FIG. 24 is the same as in FIG. 23, because as previously stated it does not matter which cell is assigned to implement each individual angle command.

FIG. 24 shows that with angle command rotation every full-cycle, each cell produces the same waveform during the three-cycle rotation period (with a one-cycle phase shift between cells). Each cell experiences one cycle of negative power flow, but the average power for each cell is positive, and is the same for all cells.

Figure 25:
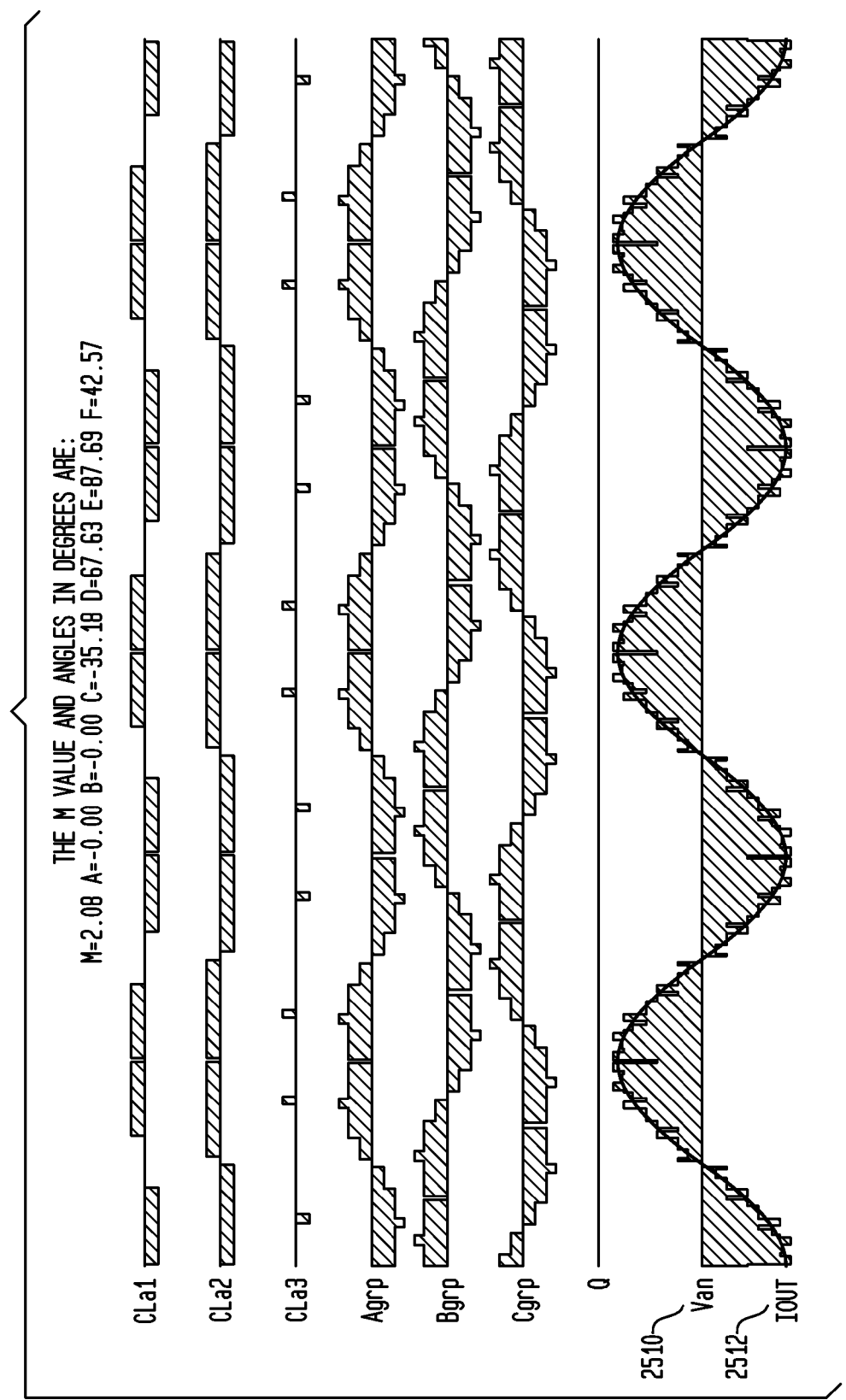
FIG. 25 illustrates exemplary waveforms using SHE control without angle duty rotation.

FIG. 25 shows the waveforms corresponding to 69% of maximum possible fundamental voltage, with no angle command rotation. The output of each A-group cell repeats for each cycle without change, and is different from the other A-group cells. As shown in FIG. 25, the power cell CLa1 is producing positive pulses during the positive half cycle. The power cell CLa2 is also producing positive pulses during the positive half cycle, but of a different duration than those of power cell CLa1. The power cell CLa3 is also producing positive pulses during the positive half cycle, but of a different duration than those of power cells CLa1 and CLa2. Thus, each of the power cells is producing a different amount of power.

Figure 26:
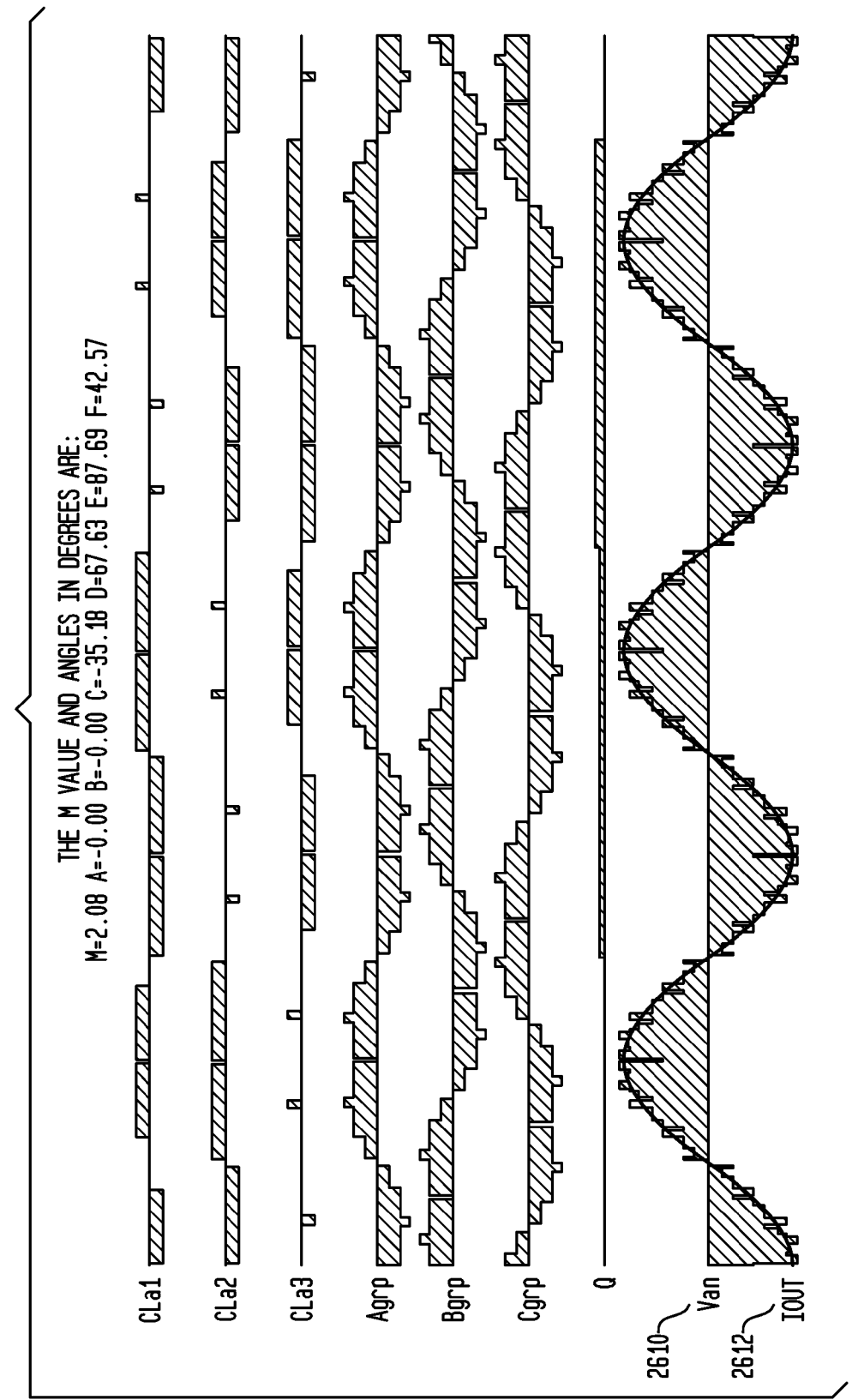
FIG. 26 illustrates exemplary waveforms using SHE control with angle duty rotation.

FIG. 26 also shows the waveforms corresponding to 69% of maximum possible fundamental voltage, but with angle command rotation. The variable Q steps through three successive values during the three-cycle rotation interval, and then tile pattern repeats. The steps occur at the end of each full-cycle, and because all the poles have the same values at those points, the rotation will not cause extra switching events. The value of Q is used to determine which SHE waveform is assigned to each cell. The load voltage 2610 from phase A to neutral in FIG. 26 is the same as in FIG. 25, because as previously stated it does not matter which cell is assigned to implement each individual angle command.

FIG. 26 shows that with angle command rotation every full-cycle, each cell produces the same waveform during the three-cycle rotation period (with a one-cycle phase shift between cells). The average power for each cell is positive, and is the same for all cells.

Figure 27:
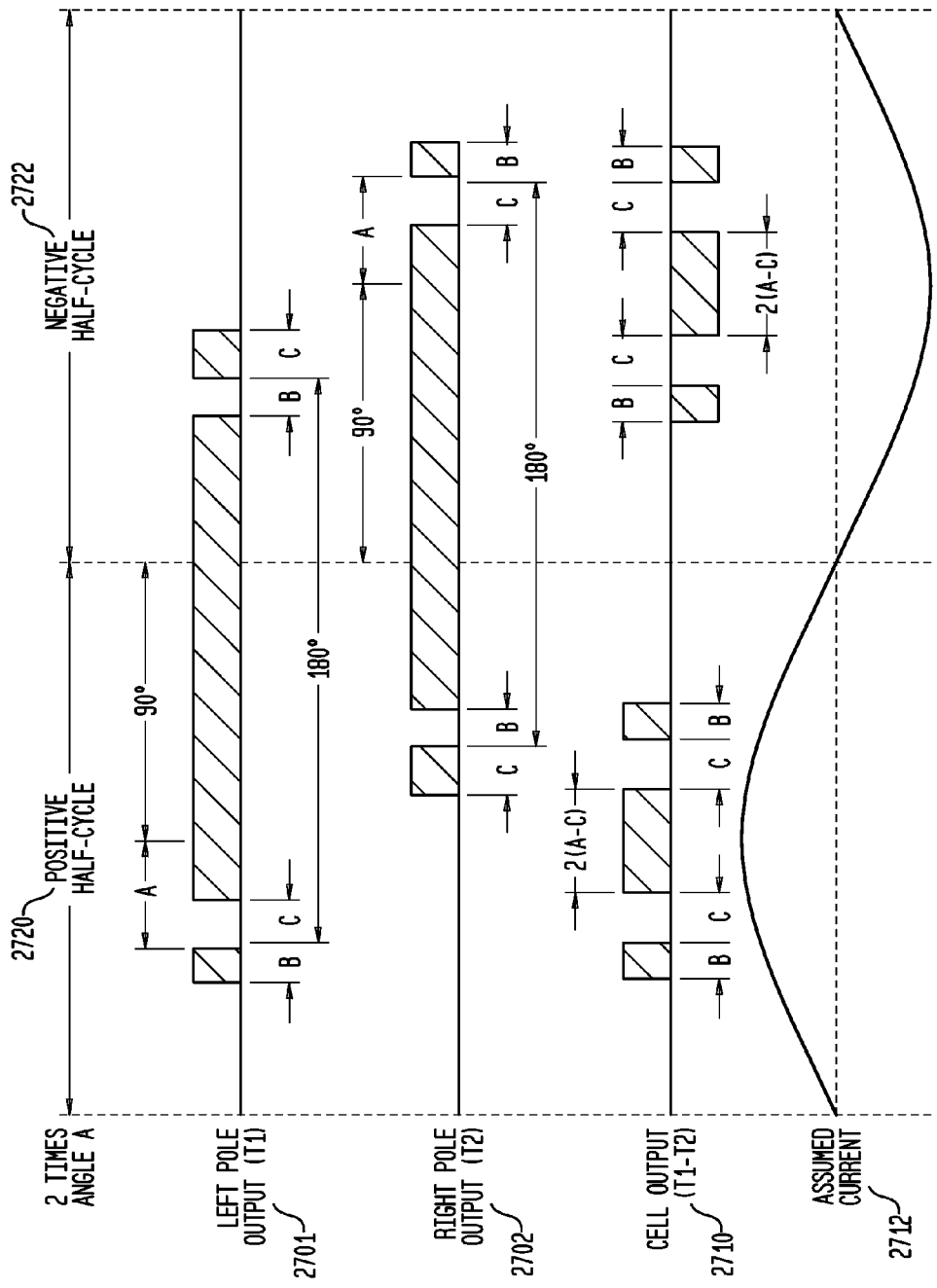
FIG. 27 illustrates a selective harmonic elimination (SHE) control pattern according to various embodiments.

As described hereinabove, SHE waveforms that provide more than one degree of freedom per cell may be utilized to control the fundamental amplitude of the output voltage and to eliminate harmonics. FIG. 27 illustrates a selective harmonic elimination (SHE) control pattern which has three degrees of freedom, and also a switching frequency equal to three times the wanted frequency.

With these notches and pulses inserted, both the left pole and the right pole switch three times per cycle instead of once per cycle. The notches and pulses cause the cell output (T1-T2) 2710 to contain three pulses in each half-cycle instead of only one pulse. The duration and location of these three pulses are determined by angle A, angle B, and angle C; so that there are three degrees of freedom.

If the SHE waveforms of FIG. 27 were used in the cells of a power supply similar to FIG. 1, causing them to switch three times per cycle, it would be possible to obtain six degrees of freedom with only two cells per phase. This could permit the same number of harmonics to be eliminated as was previously described for six cells per phase, each switching once per cycle. Such an approach might be a favorable tradeoff for many applications that could tolerate the higher switching frequency, and would still have lower switching losses than PWM control.

Figure 28:
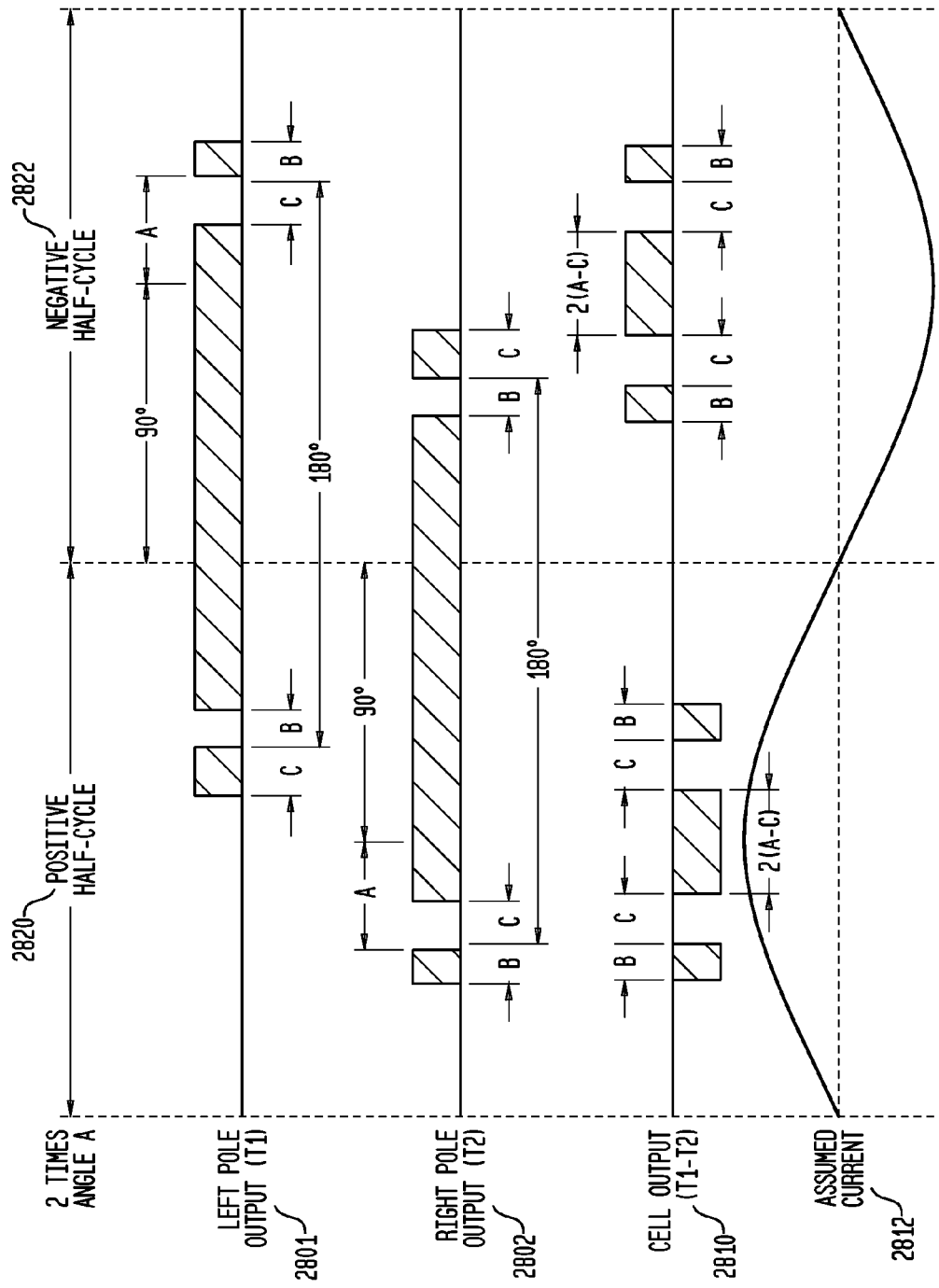
FIG. 28 illustrates a selective harmonic elimination (SHE) control pattern according to various embodiments.

FIG. 28 illustrates a SHE control pattern which has a switching frequency equal to three times the wanted frequency. This pattern is nearly identical to the control pattern of FIG. 27, except that the waveforms of the left pole T1 2701 and the right pole T2 2702 have been exchanged. The cell output 2710 is also nearly identical to that of FIG. 27, except that the polarity is reversed, so that the cell now produces negative voltage during the positive half-cycle 2720, and positive voltage during the negative half-cycle 2722. Thus, the SHE control pattern of FIG. 28 can be utilized to produce negative power flow.

For the waveforms of FIGS. 27 and 28, the process of finding SHE angles that give a desired fundamental voltage while eliminating certain harmonic voltages would be similar to the cases previously shown, for patterns that switch once per cycle and twice per cycle.

According to various embodiments, SHE waveforms may be utilized to switch the devices in a high-speed motor drive once per cycle. Then as speed (and hence frequency) is reduced, at about one-half of top speed, other SHE waveforms may be utilized to switch the devices twice per cycle. The switching losses would still be no worse than at top speed, but twice as many harmonics could be eliminated. As speed is reduced further, at about one-third of top speed, yet other SHE waveforms may be utilized to switch the devices three times per cycle. The switching losses would still be no worse than at top speed, but three times as many harmonics could be eliminated. This process may be continued further and further as the speed is reduced. Eventually, the speed may reach a point where it becomes acceptable to utilize PWM control to switch the devices.

Figure 29:
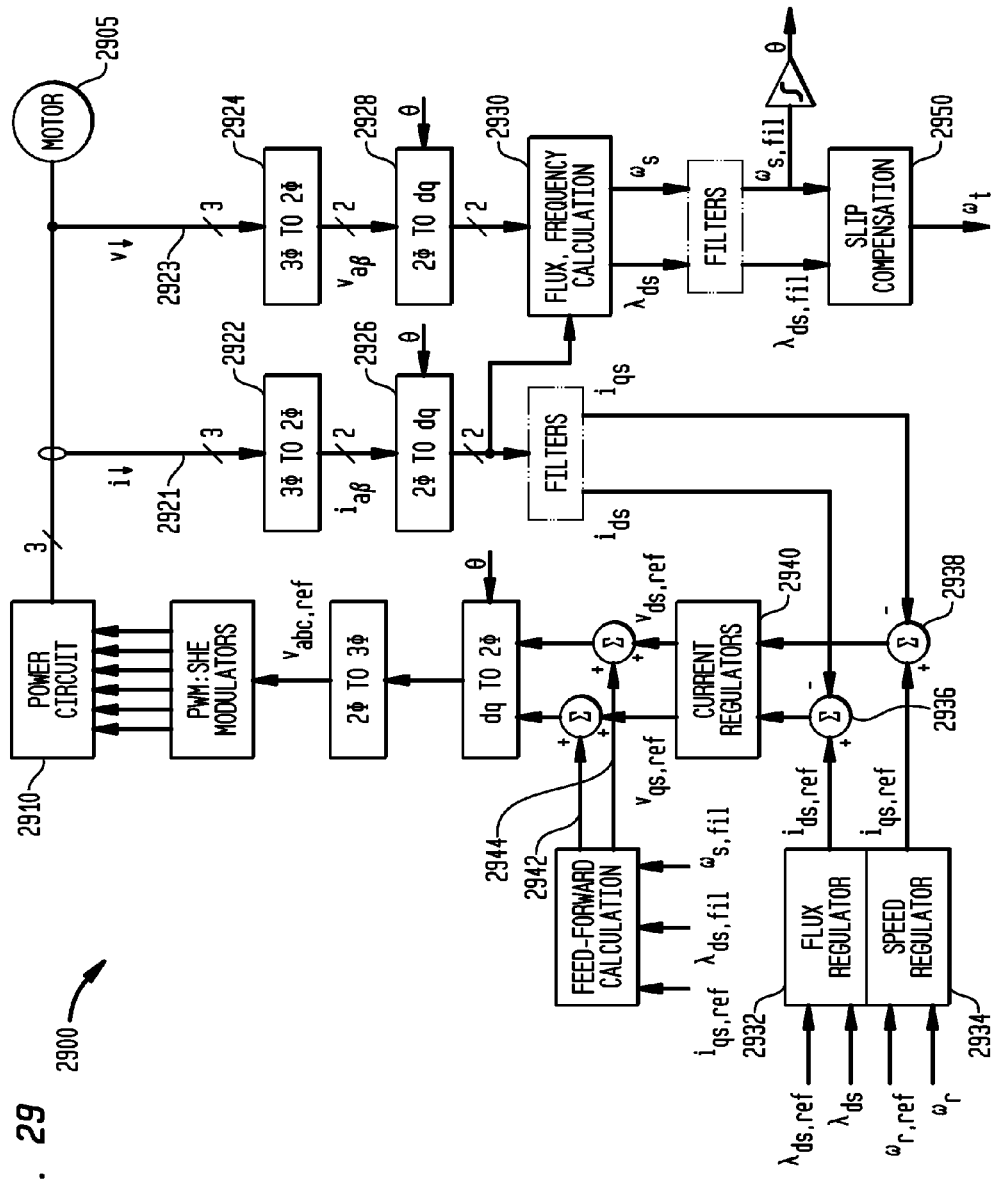
FIG. 29 illustrates an exemplary control system.

FIG. 29 illustrates an exemplary control system 2900 for controlling a high-speed AC motor 2905 using the methods described herein. Referring to FIG. 29, a power circuit 2910 is controlled by a system that measures current 2921 and voltage 2923 signals between the power circuit 2910 and rotating motor frame 2905. The measured three-phase current and voltage signals each may be transformed to a two-phase representation (2922, 2924), and to a representation that estimates voltage and current in the rotating d-q axis (2926, 2928). A flux estimator 2930 may use the d-q voltage current to determine the stator flux amplitude, frequencies and phase.

The flux speed regulators 2932, 2934 are used to generate current commands for the flux and torque producing components, 2936, 2938 respectively. The current regulators 2940 regulate the measured d-q currents to the commanded values. Feed-forward signals 2942, 2944 are added to decouple the flux and torque, and to improve transient response.

With this control method, slip compensation 2950 may be used, but typically only for induction motors. For synchronous and permanent magnet motors, in which the rotor spins at the same frequency as the stator, the slip compensation block 2950 may not provide any output. All other functions are the same. Stator resistance is the parameter that primarily affects the stability of stator flux based control. An incorrect value of rotor resistance may cause speed error only, and may not affect the torque. The problem of stability at low speeds may be addressed by using a robust motor voltage integrator (not shown) to estimate stator flux.

The embodiments described herein may be used in various applications, including high speed applications (e.g., frequencies of 250 hertz and greater), at medium voltage (2300 volts and higher) and high power (e.g., 1000 kilowatts and higher).

While several embodiments of the invention have been described herein by way of example, those skilled in the art will appreciate that various modifications, alterations, and adaptions to the described embodiments may be realized without departing from the spirit and scope of the invention defined by the appended claims.

What is claimed is:

1. A method of reducing switching losses in a power supply comprising:
   advancing the output voltage of a first pole of a power cell by a first angle;
   retarding the output voltage of a second pole of the power cell by a second angle; and
   producing a combined output voltage of the power cell equal to a positive pulse of a duration angle equal to the sum of the first angle and the second angle for a first half of a switching cycle of the power cell, and equal to a negative pulse of a duration angle equal to the sum of the first angle and the second angle for a second half of the switching cycle of the power cell.

2. The method of claim 1, further comprising:
   performing the advancing, retarding and producing for a plurality of power cells such that the first angle used for each power cell has a different value.

3. The method claim 1, wherein at least one of the first angle and the second angle is a negative angle.

4. The method of claim 1, wherein the advancing and retarding are performed so that the first angle and the second angle are equal in magnitude.

5. The method of claim 1, wherein the producing comprises:
   producing, by a first pole of the power cell, a first symmetrical square-wave voltage; and
   producing, a second pole of the power supply cell, a second symmetrical square-wave voltage;
   wherein the first symmetrical square wave voltage and the second symmetrical square wave voltage differ in at least one of polarity and phase.

6. The method of claim 5, wherein the first symmetrical square-wave voltage and the second symmetrical square-wave voltage are offset in phase.

7. The method of claim 1, further comprising applying a notch of duration of a third angle and a pulse of duration of a fourth angle to a first pole during a first half of the switching cycle, such that the power cell has three degrees of freedom during the first half of the switching cycle.

8. The method of claim 7, further comprising applying the notch of duration of the third angle and the pulse of duration of the fourth angle to a second pole during a second half of the switching cycle, such that the power cell has three degrees of freedom during the second half of the switching cycle.

9. A method of reducing switching losses in a multi-cell power supply comprising:
   applying a first angle command of a selective harmonic elimination control pattern to a first power cell of a first phase group of a multi-cell power supply;
   applying a second angle command of the selective harmonic elimination control pattern to a second power cell of the first phase group of the power supply, wherein at least one of the first angle command and the second angle command is a negative angle command;
   applying the second angle command to a power cell other than the second power cell after a first portion of a switching cycle of the power supply; and
   applying the first angle command to the second power cell.

10. The method of claim 9, wherein the applying the first angle command of the selective harmonic elimination control pattern to the first power cell of a first phase group of the power supply and the applying the second angle command of the selective harmonic elimination control pattern to the second power cell of the first phase group of the power supply are performed concurrently.

11. The method of claim 9, wherein the applying the second angle command to the first power cell after a first portion of a switching cycle of the power supply and the applying the first angle command to the second power cell are performed concurrently.

12. The method of claim 9, wherein the first and second power cells generate an equal portion of total load power during an operational interval.

13. The method of claim 9, wherein the first angle command, the second angle command, and any other angle commands are selected such that a first harmonic generated by the power supply is equal to a desired output voltage.

14. A multi-cell power supply comprising:
a plurality of power cells arranged into at least a first phase group; and
a control system in communication with the power cells, wherein the control system is configured to:
apply a first angle command of a selective harmonic elimination control pattern to first power cell of the first phase group,
apply a second angle command of the selective harmonic elimination control pattern to a second power cell of the first phase group, wherein at least one of the first angle command and the second angle command is a negative angle command,
apply the second angle command to a power cell other than the second power cell after a first portion of a switching cycle of the power supply, and
apply the first angle command to the second power cell.

15. The power supply of claim 14, wherein the control system is further configured to apply the first angle command of the selective harmonic elimination control pattern to the first power cell of the first phase group and to apply the second angle command of the selective harmonic elimination control pattern the second power cell of the first phase group concurrently.

16. The power supply of claim 14, wherein the control system is further configured to apply the second angle command to the first power cell and apply the first angle command to the second power cell concurrently.

17. The power supply of claim 14, wherein the first and second power cells are configured to generate an equal portion of total load power during an operational interval.

18. The power supply of claim 14, wherein the first angle command, the second angle command, and any other angle command are selected such that a first harmonic generated by the power supply is equal to a desired output voltage.

19. The power supply of claim 14, wherein the control system comprises:
a torque signal producing component that receives an output from a speed regulator and a q-axis current estimate to generate a torque signal;
a flux signal producing component that receives an output from a flux regulator and a d-axis current estimate to generate a flux signal; and
current regulators that adjust the torque signal and flux signals to values to be used to command the plurality of power cells.

* * * * *